US011433972B2

(12) United States Patent
Pasqua

(10) Patent No.: US 11,433,972 B2
(45) Date of Patent: Sep. 6, 2022

(54) BICYCLE GEARSHIFT WITH HIGH-PRECISION CONTROL AND METHOD FOR CARRYING OUT GEARSHIFTING IN A BICYCLE GEARSHIFT

(71) Applicant: CAMPAGNOLO S.r.l., Vicenza (IT)

(72) Inventor: Paolo Pasqua, Camisano Vicentino (IT)

(73) Assignee: Campagnolo S.r.L., Vicenza (IT)

( * ) Notice: Subject to any disclaimer, the term of this patent is extended or adjusted under 35 U.S.C. 154(b) by 454 days.

(21) Appl. No.: 16/592,056

(22) Filed: Oct. 3, 2019

(65) Prior Publication Data

US 2020/0108890 A1 Apr. 9, 2020

(30) Foreign Application Priority Data

Oct. 8, 2018 (IT) .......................... 102018000009245

(51) Int. Cl.
*B62M 9/124* (2010.01)
*B62M 9/1242* (2010.01)
(Continued)

(52) U.S. Cl.
CPC ............ *B62M 9/124* (2013.01); *B62M 9/121* (2013.01); *B62M 9/1242* (2013.01); *B62M 9/125* (2013.01);
(Continued)

(58) Field of Classification Search
CPC ...... B62M 9/121; B62M 9/122; B62M 9/124; B62M 9/125; B62M 9/126; B62M 9/1242; B62M 9/1244; B62M 9/1246; B62M 9/1248; B62M 2009/12406; B62M 2009/12413; B62M 9/131; B62M 9/132;
(Continued)

(56) References Cited

U.S. PATENT DOCUMENTS 7,549,662 B2 * 6/2009 Righi .................... B62M 9/124
474/82
9,085,340 B1 * 7/2015 Sala ....................... B62M 9/132
(Continued)

FOREIGN PATENT DOCUMENTS

CN 1375648 A 10/2002
CN 101462578 A 6/2009
(Continued)

OTHER PUBLICATIONS

Italian Search Report and Written Opinion in Italian Application No. 102018000009245, dated Jun. 13, 2019, with English translation.

*Primary Examiner* — Michael R Mansen
*Assistant Examiner* — Raveen J Dias
(74) *Attorney, Agent, or Firm* — Volpe Koenig

(57) ABSTRACT

A bicycle gearshift is operated by imposing on the chain guide a primary displacement in the axial direction with respect to a cogset, to move the chain between the sprockets. Simultaneously with imposing on the primary displacement imposing on the chain guide a secondary displacement in the radial direction with respect to the cogset. The secondary displacement is of a greater size when the primary displacement takes place in the area of the cogset with the larger sprockets whereas it is of a smaller size when the primary displacement takes place in the area of the cogset with the smaller sprockets.

12 Claims, 24 Drawing Sheets

(51) Int. Cl.
*B62M 9/121* (2010.01)
*B62M 9/125* (2010.01)
*B62M 9/126* (2010.01)

(52) U.S. Cl.
CPC ... *B62M 9/126* (2013.01); *B62M 2009/12406* (2013.01)

(58) Field of Classification Search
CPC .. B62M 9/134; B62M 9/1342; B62M 9/1344; B62M 9/1348; B62M 9/135; B62M 9/136
See application file for complete search history.

(56) References Cited

U.S. PATENT DOCUMENTS

| | | | | |
|---|---|---|---|---|
| 9,656,723 | B1* | 5/2017 | Tachibana | B62M 9/122 |
| 10,793,222 | B1* | 10/2020 | Harris | B62M 9/125 |
| 2002/0061797 | A1* | 5/2002 | Valle | F16H 61/32 |
| | | | | 474/70 |
| 2003/0027674 | A1* | 2/2003 | Valle | B62M 9/132 |
| | | | | 474/70 |
| 2003/0083162 | A1 | 3/2003 | Tsai et al. | |
| 2005/0266945 | A1* | 12/2005 | Meggiolan | B62M 25/08 |
| | | | | 474/70 |
| 2006/0100045 | A1* | 5/2006 | Fukuda | B62M 25/08 |
| | | | | 474/70 |
| 2006/0183584 | A1* | 8/2006 | Fukuda | B62M 25/08 |
| | | | | 474/70 |
| 2008/0227572 | A1* | 9/2008 | Sakaue | B62M 9/122 |
| | | | | 474/82 |
| 2009/0098963 | A1* | 4/2009 | Watarai | B62K 23/06 |
| | | | | 474/80 |
| 2009/0163310 | A1 | 6/2009 | Yamaguchi et al. | |
| 2011/0224035 | A1* | 9/2011 | Wehage | B62M 9/1242 |
| | | | | 474/80 |
| 2014/0243127 | A1* | 8/2014 | Pasqua | B62M 9/122 |
| | | | | 474/80 |
| 2014/0243129 | A1* | 8/2014 | Pasqua | B62M 9/1248 |
| | | | | 474/82 |
| 2014/0243130 | A1* | 8/2014 | Pasqua | B62M 9/125 |
| | | | | 474/82 |
| 2017/0334518 | A1* | 11/2017 | Bortoli | B62M 9/124 |
| 2017/0334519 | A1* | 11/2017 | Sala | B62M 25/08 |
| 2017/0341708 | A1 | 11/2017 | Bernardele | |
| 2018/0170481 | A1* | 6/2018 | Pasqua | B62M 9/1246 |
| 2021/0403124 | A1* | 12/2021 | Fujimoto | B62M 9/132 |
| 2021/0403126 | A1* | 12/2021 | Fujimoto | B62M 9/135 |

FOREIGN PATENT DOCUMENTS

| | | |
|---|---|---|
| CN | 107444564 A | 12/2017 |
| EP | 2 769 907 A1 | 8/2014 |
| EP | 3 339 159 A1 | 6/2018 |

\* cited by examiner

BICYCLE GEARSHIFT WITH HIGH-PRECISION CONTROL AND METHOD FOR CARRYING OUT GEARSHIFTING IN A BICYCLE GEARSHIFT

CROSS REFERENCE TO RELATED APPLICATION

This application claims the benefit of Italian Application No. 102018000009245, filed on Oct. 8, 2018, which is incorporated herein by reference as if fully set forth.

FIELD OF INVENTION

The present invention relates to a bicycle gearshift with high-precision control.

BACKGROUND

The term bicycle gearshift is meant to indicate a mechanical device that causes the displacement of the transmission chain among different chainrings, for such a purpose moving a chain guide in which the chain is engaged.

In the context of this patent description and of the following claims, the gearshift being referred to is the rear one that moves the transmission chain among the different sprockets of a cogset associated with the rear wheel of the bicycle.

Normally, the bicycle gearshift comprises an articulated quadrilateral linkage (typically an articulated parallelogram) with a base body and a mobile body opposite the base body in the articulated quadrilateral, connected together through a pair of connecting rods hinged to such bodies according to four hinging axes through four pin elements, wherein the base body is fixed to the frame of the bicycle and the mobile body is fixed to a chain guide.

The deformation of the articulated quadrilateral therefore determines a primary displacement of the chain guide with respect to the frame in the axial direction with respect to the cogset and, in this way, the gearshifting.

The deformation of the articulated quadrilateral can be obtained with manual actuation, through the movement of control levers and the transmission thereof to the articulated quadrilateral through a cable (for example of the Bowden type), or with motorized actuation, thanks to an electric motor that—following suitable control imparted by the cyclist and through a suitable mechanism—moves mutually different parts of the articulated quadrilateral, deforming it and thus moving the chain guide.

A constant objective of manufacturers of gearshifts is that of improving the precision of actuation, upon which the ease and reliability of operation of the gearshift depends.

This requirement is of even greater importance the more the gearshift is intended to be used in high-level cycling competitions.

In order to obtain a high precision of control of known bicycle gearshifts, an initial adjustment of the bicycle is carried out with the purpose of optimizing the tensioning of the chain depending on the configuration and structure of the frame and of the cogset associated with the rear wheel.

Some gearshifts, used particularly for mountain-bikes, comprise an initial setting interface of a relative angular position between the base body of the linkage and the frame and a chain tensioning spring, inserted in the linkage, which make it possible to determine the configuration of the chain guide when engaged with the chain of a transmission.

In such types of gearshift, the initial adjustment acts on the relative angular position between the base body of the linkage and the frame, as well as on the spring inserted in the linkage, possibly imposing a preload on it, in order to maintain the correct tension of the transmission chain in the different travel configurations.

The initial setting of the relative angular position between the base body and the frame and of the preload of the chain tensioning spring is carried out so as to lift the chain guide to bring it as close as possible to the sprockets.

Indeed, a reduced distance between the chain guide and the sprockets determines greater sensitivity of control since, in such conditions, the displacement component of the chain guide parallel to the axis of the sprockets corresponds to an inclination exerted on the chain sufficient to trigger a movement from one sprocket to the other.

The lifting of the chain guide towards the sprockets, however, has a limitation dictated by the sprocket of largest diameter. Indeed, going too close to the sprocket of largest diameter causes drawbacks such as the sensation of a rough shift between the lowest gear ratio and the next one, as well as grazing between the chain and the chain guide in the case of a lower gear ratio and pedaling backwards.

In the adjustment configuration closest to the sprockets, imposed by the size of the largest sprocket, there is still, however, a substantial vertical spacing between the chain guide and the sprockets of smaller size and, consequently, the precision of the gearshift control between the higher ratios is lower than between the lower ratios.

In order to avoid these drawbacks and to improve the precision of gearshifting, EP 2769907 A1 of the same Applicant describes a gearshift in which the mobile body is given a complex movement, such that when the mobile body of the gearshift is moved (with any gearshift actuation system) determining the primary displacement of the chain guide in the direction of the axis of the cogset, the base body is rotated with respect to the frame of the bicycle, so as to determine a simultaneous secondary displacement of the chain guide, in the radial direction with respect to the axis of the cogset. It is thus possible to ensure that the chain guide is very close to the cogset even when the chain engages one of the smaller sprockets.

Although this solution in any case makes it possible to improve the precision of gearshifting thanks to bringing the chain guide close to the cogset, the Applicant has realized that with certain cogsets, especially the increasingly common ones with a very large number of sprockets (11, 12 or even more) the radial distance between the chain guide and the cogset can be minimized only at the largest sprockets and at the smallest ones, whereas at the intermediate sprockets it is inevitable that there will be a greater distance.

The reason for this drawback is that in a cogset with a large number of sprockets the difference in the number of teeth between two adjacent sprockets is normally equal to 1 for the smallest sprockets, to 2 for the largest sprockets; these are the well-known conditions often indicated briefly in the field with jump 1 and jump 2. This determines that the outer profile of the cogset (seen in the radial direction, for example from behind with respect to the direction of travel) diverges from a conical shape and has a shape indicatively like a funnel, i.e. determined by two conical shapes brought together having different inclinations: a first inclination (lower, i.e. diverging less from a condition parallel to the axis of the cogset) at the smaller sprockets, a second inclination (greater) at the larger sprockets.

Therefore, the problem forming the basis of the invention is that of avoiding the aforementioned drawbacks, by providing a bicycle gearshift that is capable of offering even greater gearshifting precision.

More specifically, the problem forming the basis of the present invention is that of making a bicycle gearshift that makes it possible to reduce the distance of positioning between the chain guide and the sprockets of intermediate size with respect to the gearshift known from EP 2769907 A1.

SUMMARY

The present invention relates to a bicycle gearshift and a method for carrying out gearshifting wherein the bicycle gearshift comprises:

an articulated quadrilateral linkage with a base body and a mobile body connected together through a pair of connecting rods articulated to the base body and to the mobile body, a fixing group of the base body to a bicycle frame, a chain guide mounted on the mobile body, the articulated quadrilateral linkage being associated with means for actuating the gearshift adapted for deforming the articulated quadrilateral linkage so as to determine a displacement of the mobile body with respect to the base body and consequently a primary displacement of the chain guide in the axial direction with respect to the axis (A) of a cogset.

The fixing group of the bicycle gearshift comprises:

a pin body, having an axis intended for fixing the base body to the frame of the bicycle, a mechanism for changing the relative angular position between the base body of the articulated quadrilateral linkage and the frame as a function of the primary displacement of the chain guide, wherein the mechanism for changing the relative angular position between the base body and the frame comprises:

a rotary body connected to the pin body so that a rotation of the rotary body determines a relative rotation about the axis between the pin body and the base body;

a pin directly or indirectly set in rotation by the means for actuating the gearshift, a transmission between the pin and the rotary body has a variable gear ratio.

BRIEF DESCRIPTION OF THE DRAWINGS

Further features and advantages of the present invention will become clearer from the following detailed description of some preferred embodiments thereof, made with reference to the attached drawings. In such drawings.

DETAILED DESCRIPTION OF THE PREFERRED EMBODIMENTS

Figure 1:
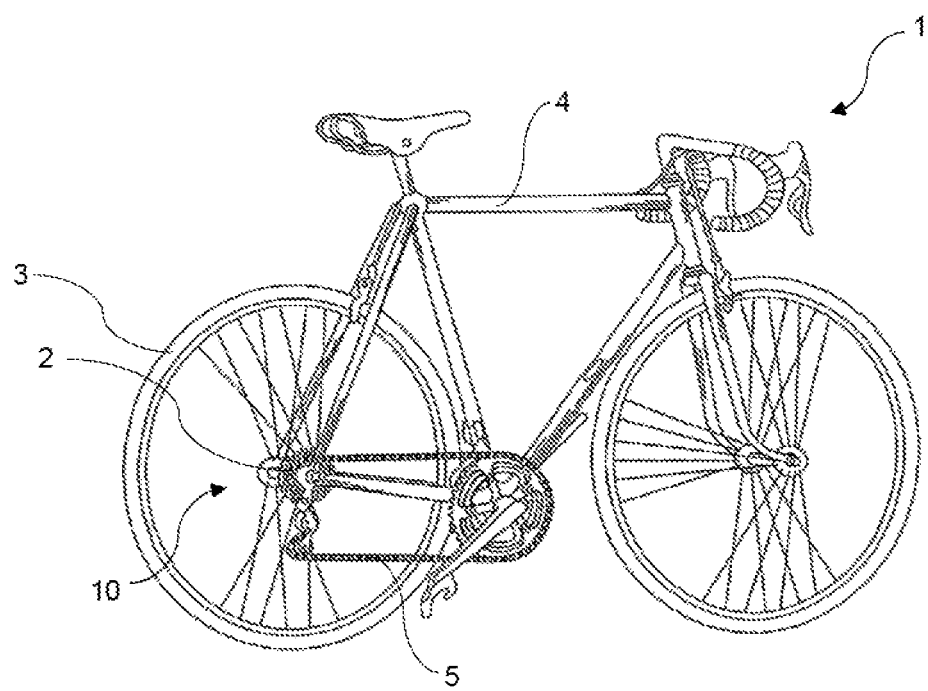
FIG. 1 is a schematic view of a bicycle using a bicycle gearshift according to the present invention.
Figure 2:
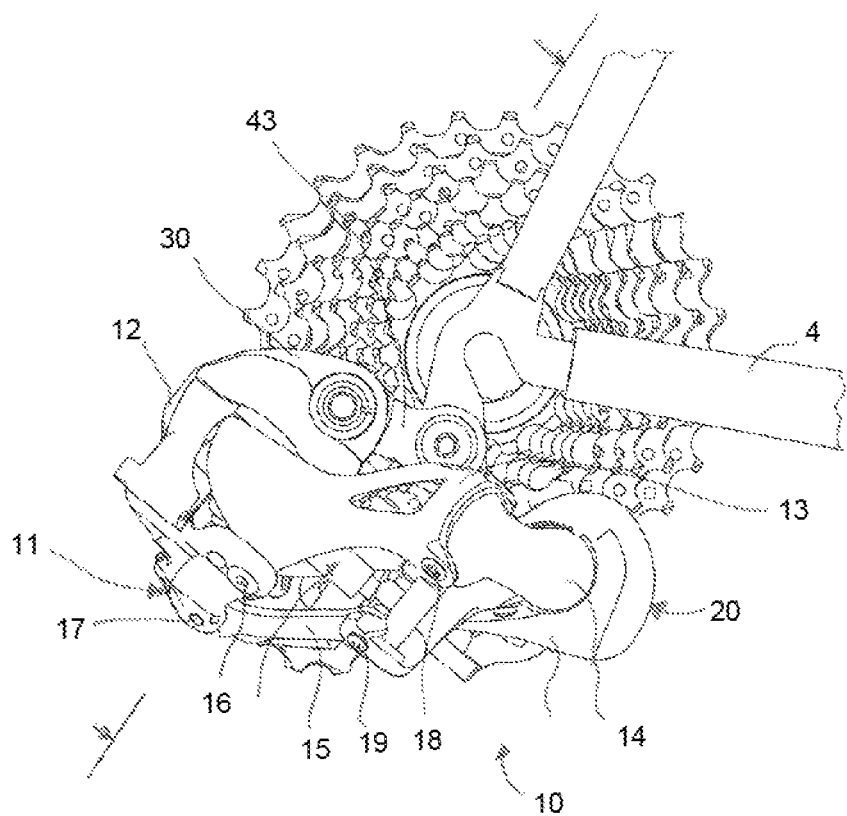
FIG. 2 shows a bicycle gearshift according to the present invention associated with a section of a bicycle frame and with a cogset.
Figure 3:
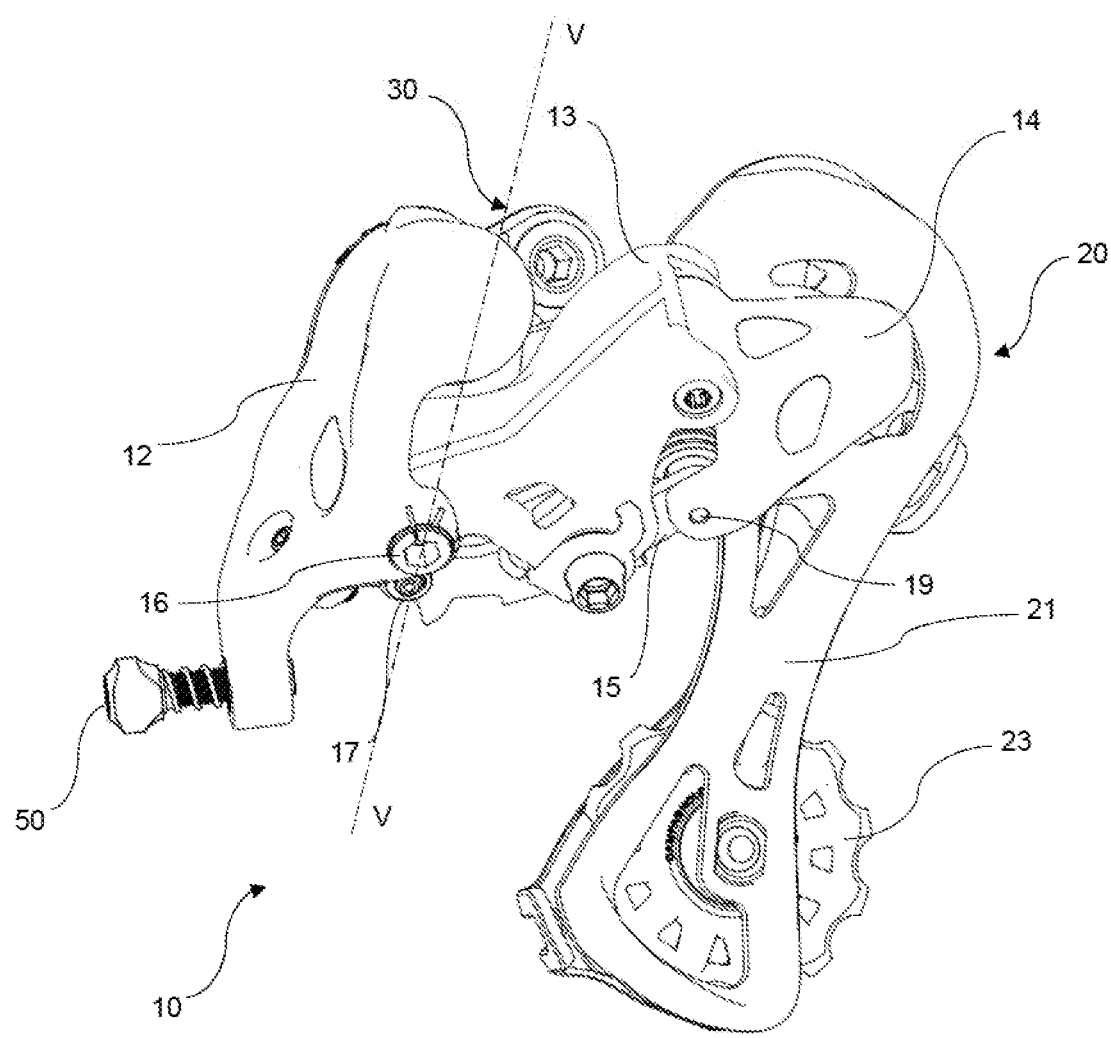
FIG. 3 is a front view of the gearshift according to the invention, taken according to a transversal direction with respect to the bicycle (not represented)
Figure 4:
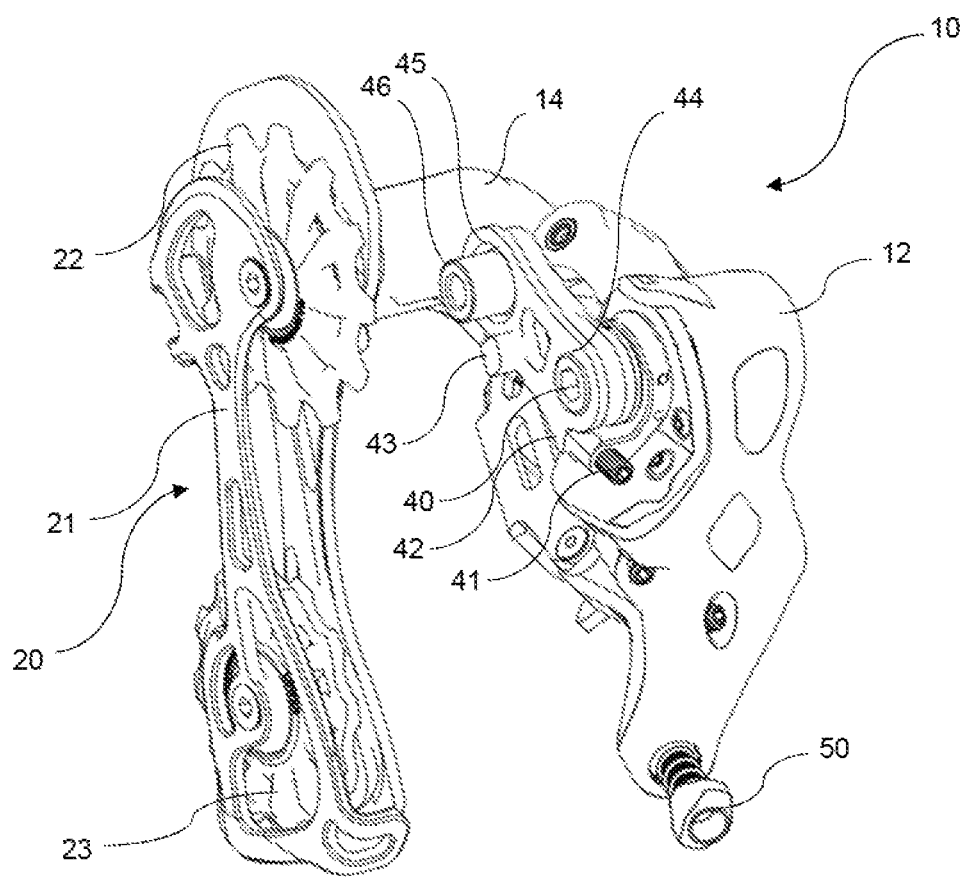
FIG. 4 is a rear view of the gearshift of FIG. 3, taken according to a transversal direction with respect to the bicycle (not represented)
Figure 5:
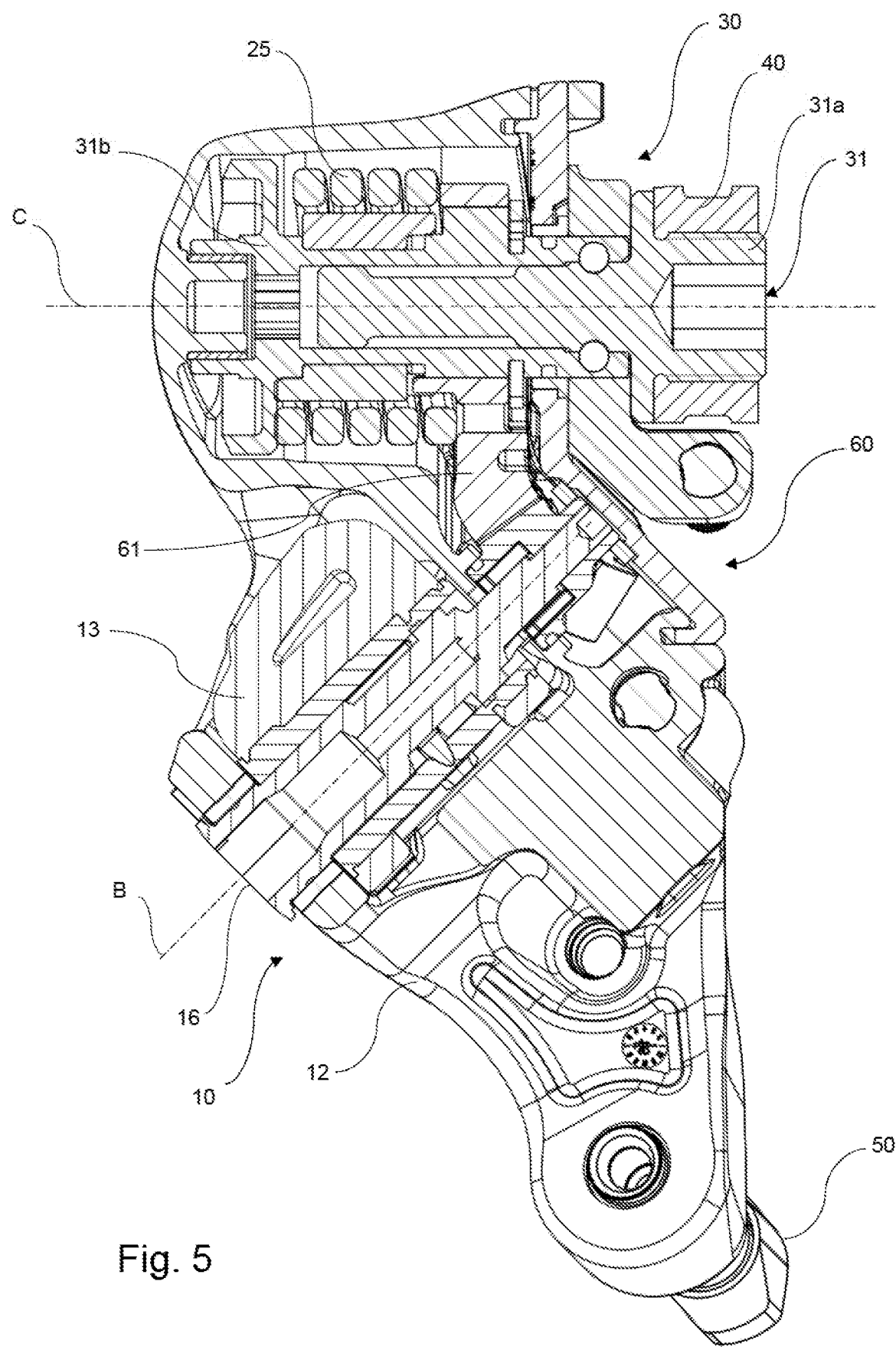
FIG. 5 is a section view of the gearshift of FIG. 3, according to the plane V-V.

According to the invention, the transmission between the pin and the rotary body has a variable gear ratio.

Here and hereinafter the term transmission with variable gear ratio is meant to indicate a transmission between two rotating members (such as indeed the pin and the rotary body) which has a configuration such that the gear ratio changes during the rotation of the rotating members themselves.

Thanks to the variable gear ratio, the rotation of the mobile body with respect to the pin body and thus to the frame (responsible for the secondary displacement of the chain guide) is no longer linearly proportional to the rotation of the pin (linked to the primary displacement of the chain guide). By suitably selecting and sizing this transmission, it is thus possible to ensure that the secondary displacement of the chain guide at a primary displacement is comparatively greater when the primary displacement is in the area of the cogset with the larger sprockets, where there is a jump 2 condition (difference of two teeth between one sprocket and the next), with respect to when the primary displacement is in the area of the cogset with the smaller sprockets, where there is a jump 1 condition (difference of one tooth between one sprocket and the next).

Preferably, the pin and the rotary body can be coupled together in at least two mutual angular positions, so as to be able to give different initial calibrations to the gearshift.

Preferably, the transmission between the pin and the rotary body comprises a non-circular gear, with a toothed sector rotating as a unit with the rotary body and a sprocket rotating as a unit with the pin, wherein the toothed sector and the sprocket are in mutual engagement and have toothings with variable diameter. Here and hereinafter, the term toothing with variable diameter is meant to indicate a toothing in which at each tooth a toothing diameter of its own is provided, different from that at the adjacent teeth.

It is thus possible to size the toothed sector and the sprocket so that the gear ratio changes from a minimum value to a maximum value, at a rotation of the sprocket (and thus of the pin) corresponding to an excursion of the chain guide along the entire cogset, in the axial direction. The angular extension of the toothed sector and of the sprocket is less than 360°, with it being sufficient that it encompasses the angle corresponding to the complete excursion of the chain guide; normally, between 45° and 90° are necessary for the toothed sector and between 90° and 180° for the sprocket. In terms of number of teeth, in order to ensure good homogeneity of transmission, it is preferable for the toothed sector and the sprocket to have a number of teeth that is the same or different by one and for this number to be equal to at least 4, even better at least 5, preferably 7 on the sprocket and 8 on the toothed sector.

Preferably, the pin and the sprocket can be selectively coupled with each other in at least two mutual angular positions, more preferably through a coupling. It is thus possible to give different calibrations to the gearshift, by adjusting the transmission with variable ratio in different ways so as to thus obtain secondary displacements of the chain guide (i.e. in the radial direction, with respect to the cogset) of different values at different positions in the axial direction; in practice, it is possible in this way to calibrate the gearshift in a different way according to the specific cogset mounted. This possibility is particularly useful when there is the option of mounting different cogsets, for example to adapt the bicycle to a flat race rather than steep climbs.

In other words, the transmission has a maximum angular excursion and a useful angular excursion; the useful excursion can be selected within the limits of the maximum excursion according to the cogset that it is wished to use.

Preferably, the coupling is a front coupling and comprises:

an axial hole formed in the sprocket and provided with at least two pairs of opposite seats extending radially from the hole, two opposite fins formed extending radially on the pin, in removable engagement in one of the pairs of seats in the hole of the sprocket.

This configuration ensures substantial solidity of coupling, said solidity ensuring minimum deformations and thus high precision of actuation.

Even more preferably, there are only two pairs of seats. Indeed, it is normally sufficient to have two mutual coupling positions between the pin and the sprocket to ensure a possibility of adjustment that is more than sufficient in practice.

Preferably, the pairs of seats are offset from one another by an angle comprised between 10° and 45°, preferably equal to about 35°.

Preferably, the pin is mounted between the base body and the first of the two connecting rods, housed in a seat formed in the connecting rod, locked in the seat with respect to rotation and rotatable with respect to the base body. In this way, the pin is the same pin that ensures the hinging of the first connecting rod to the base body and—during the operation of the gearshift—thus rotates with respect to the base body directly by the same angle by which the first connecting rod rotates, again with respect to the base body. The absence of intermediate elements ensures the maximum precision of operation.

Preferably, the pin comprises a stem with polygonal section and the seat has a corresponding polygonal section. This coupling ensures the maximum precision in the angular direction, so that every rotation is transmitted without dead angles, whereas it allows the displacement in the axial direction.

Alternatively, the seat in the connecting rod comprises a shaped portion, formed with the help of a detachable portion of the connecting rod, and the stem has a corresponding shaped section. This coupling, as well as excellent precision, facilitates the assembly operations.

Preferably, the pin can be moved axially in the seat between a withdrawn coupling position in which it is coupled with the sprocket and an extracted decoupling position in which it is released from the sprocket; removable locking means are provided to keep the pin in the withdrawn position and possibly in the extracted position. The coupling position is clearly that of normal operation, whereas the decoupling position makes it possible to rotate the pin with respect to the sprocket without having to remove it, so as to be able to select in which pair of seats to engage the pair of fins, according to the cogset used.

In a preferred embodiment, the removable locking means comprise:

two recesses formed in the pin, aligned and spaced in the direction of the axis of the pin, a pointer mounted in a lateral hole formed in the seat, an elastic element in the lateral hole, said elastic element elastically pressing the pointer in the radial direction so as to keep it engaged with one or other of the two recesses.

It is thus possible to move the pin from its coupling position to the decoupling position and vice-versa easily, by simply forcing the pin in the axial direction, so as to overcome the thrust of the pointer in the recesses.

In another preferred embodiment, the removable locking means comprise:

a slit open transversally on the seat, a lateral window of the slit, longitudinal with respect to the slit and facing the outside of the first connecting rod, a bolt, mounted mobile in the slit between a retaining position in which it projects inside the seat and holds the pin in its withdrawn coupling position with the sprocket and a release position in which it does not project in the seat and allows the pin to be brought into its extracted decoupling position from the sprocket, an elastic element that pushes the bolt into its retaining position, a maneuvering portion of the bolt, projecting from the window so as to be able to be actuated to move the bolt in contrast to the elastic element.

Also in this case, it is possible to move the pin from its coupling position to the decoupling position and vice-versa easily, by simply moving the bolt in the slit, in contrast to the thrust of the elastic element, so as to make the pin free in the axial direction.

Preferably, there is an end stop mechanism of the pin, to prevent it from slipping from the seat beyond the extracted position.

In this way, the risk is avoided of inadvertently completely withdrawing the pin, thus separating the first connecting rod from the base body, which could result in the disassembly of the articulated quadrilateral.

Preferably, the gearshift comprises an outer indicator of the mutual angular position between the pin and the sprocket.

This allows the user to immediately recognize, from the outside and without dismounting anything, which initial calibration has been set between pin and sprocket and thus for which cogset the gearshift has been configured.

With reference to the attached figures, a bicycle gearshift is shown, wholly indicated with 10.

The bicycle gearshift 10 referred to is the rear one that moves a transmission chain 5 among a plurality of sprockets collected in a cogset 2 having an axis A, associated with a rear wheel 3 of a bicycle 1.

The bicycle gearshift 10 comprises an articulated quadrilateral linkage 11 with a base body 12 and a mobile body 14 connected together through a pair of connecting rods 13, 15, the first connecting rod 13 of which is articulated to the base body 12 at a first hinging axis B through a first pin 16 and to the mobile body 14 at a second hinging axis through a second pin 17, whereas the second connecting rod 15 is articulated to the base body 12 at a third hinging axis through a third pin 18 and to the mobile body 14 at a fourth hinging axis through a fourth pin 19.

The base body 12 is intended to be fixed to a frame 4 of the bicycle 1.

The mobile body 14, opposite the base body 12 in the articulated quadrilateral 11, carries a chain guide 20.

The chain guide 20 comprises a rocker arm 21 carrying an upper roller 22 and a lower roller 23 for relaying the chain 5.

For the coupling between the base body 12 and the frame 4 there is a first fixing group 30 that comprises a pin body 31 having axis C, intended for fixing said base body 12 to the frame 4 of the bicycle 1.

The pin body 31 comprises a cylindrical bushing 31*b* and a closing screw 31*a* provided with an enlarged head adapted for abutting against the base body 12. The cylindrical bushing 31*b* and the closing screw 31*a* are screwed to one another in order to hold the base body 12 between them, preventing an axial movement thereof along the axis C but allowing the rotation thereof.

The closing screw 31*a* of the pin body 31 is engaged on a fixing element 40 to the frame 4 the relative angular position with respect to the frame 4 of which is adjustable.

For this purpose, there is an adjustment screw 41 that engages tangentially on the fixing element 40 and abuts against a projection 42 fixed with respect to the frame 4.

The fixing element 40 to the frame 4 and the adjustment screw 41 therefore constitute an initial setting interface of a relative angular position between the base body 12 and the frame 4.

The adjustment of the initial relative angular position between the base body 12 of the articulated quadrilateral linkage 11 and the frame 4, generally carried out during mounting, has the purpose of adapting the bicycle gearshift 10 to the different types of frames 4 and cogsets 2, influencing the positions able to be taken up by the chain guide 20 with respect to such a frame 4 and, consequently, with respect to the cogset 2.

The initial setting interface 40, 41 of a relative angular position cooperates with a relay element 43 provided with a pair of holes 44, 45 and on which the projection 42 is made. In particular, the fixing element 40 is inserted in a first hole 44, whereas the second hole 45 is intended for fixing to the frame 4 through a clamping screw 46.

An anti-impact spring 25 is preferably mounted coaxially on the pin body 31. The term anti-impact spring is meant to indicate a spring that, in normal operation, is rigid, but that in the case of impacts, and thus when external forces beyond a certain limit intervene, intervenes by deforming and absorbing such external forces.

In the gearshift 10, in the case of impacts, the anti-impact spring 25 transfers its action to the base body 12, allowing a temporary mutual rotation between the base body 12 and the pin body 31 and in this way avoiding damage to the gearshift 10 as well as, in particular, to the articulated quadrilateral linkage 11. For this purpose, a first end of the anti-impact spring 25 is indirectly associated with the base body 12 and a second end is associated with the pin body 31.

For the rotary coupling between the mobile body 14 and the rocker arm 21 of the chain guide 20 there is a per se conventional fixing group, not illustrated or described in detail hereinafter.

Means are also provided for actuating the gearshift 10 adapted for modifying the configuration of the articulated quadrilateral linkage 11 so as to determine a relative displacement between the mobile body 14 and the base body 12 and, consequently, a displacement of the chain guide 20 with respect to the frame 4.

Such actuation means can be of any of the numerous types known in the field, manual or motorized. In the figures, merely as an example, it is possible to see a sheath seat 50, adapted for receiving the end (not illustrated) of a Bowden cable of a manual actuation.

Although it is not highlighted in the figures, there is also a clamp for fixing the end of the core of the Bowden cable, in diagonally opposite position with respect to the sheath seat 50 in the articulated quadrilateral linkage 11, so that the traction imposed by a relative movement between the sheath and the core of the cable determines a deformation of the articulated quadrilateral linkage 11.

The traction action imposed by the relative movement between the sheath and the core of the cable is counteracted by a return spring 51, arranged at the fourth pin 19.

According to the present invention, the first fixing group 30 comprises a mechanism 60 for changing the relative position between the base body 12 of the articulated quadrilateral linkage 11 and the frame 4 as a function of a primary displacement of the chain guide 20 so as to determine a change of the configuration of the chain guide 20.

The mechanism 60 for changing the relative position comprises a rotary body 61 provided with at least one toothed sector 62 connected to the pin body 31 so that a rotation of the rotary body 61 determines a relative rotation between the pin body 31 and the base body 12 about the axis C of the pin body 31, and at least one sprocket 63, preferably of frusto-conical configuration, which engages with the toothed sector 62 in order to transfer a commanded rotation to it.

The toothed sector 62 and the sprocket 63 do not extend for 360° about the respective axes, but only for a much smaller angle, sufficient to cover the operating requirements. In particular, the toothed sector 62 extends for an angle comprised between 45° and 90°, preferably about 60°, whereas the sprocket 63 extends for an angle comprised between 90° and 180°, preferably about 120°. The toothed sector 62 and the sprocket 63 preferably comprise a number of teeth that is the same or different by one, preferably at least equal to four: in the illustrated example, the toothed sector 62 has eight teeth, whereas the sprocket 63 has 7. The ratio between the angular extension of the toothed sector 62 (driven) and of the sprocket 63 (driving) is equal to 1:2.

In particular, the rotary body 61 is constrained to the cylindrical bushing 31b of the pin body 31, through the interposition of the anti-impact spring 25. The sprocket 63 is mounted in a fixedly connected manner on the pin 16 on which the commanded rotation is imparted that at the same time determines a displacement of the chain guide 20, having at least one axial component. Therefore, the toothed sector 62 and the sprocket 63 together form a gear that constitutes a transmission between the pin 16 and the rotary body 61.

The mechanism 60 for changing the initial relative position is actuated through a relative rotation between the base body 12 and the first connecting rod 13 of the articulated quadrilateral linkage 11. Such a relative rotation between the base body 12 and the first connecting rod 13 also determines a deformation of the articulated quadrilateral linkage 11 and, consequently, a primary displacement of the chain guide 20 along the axis A.

In order that a rotation between base body 12 and connecting rod 13 determines a rotation of the sprocket 63, the latter is fixedly connected to the first pin 16, which is in turn fitted to the first connecting rod 13, i.e. rotating as a unit with it (for example, through a polygonal or grooved profile coupling).

In this way, the movement of the first connecting rod 13 causes the movement of the first pin 16 which, in turn, determines a rotation of the sprocket 63 and, consequently, of the toothed sector 62 of the rotary body 61 and of the cylindrical bushing 31b of the pin body 31.

In this way, a relative rotation between the base body 12 and the pin body 31 of the first fixing group 30 correlated to an axial displacement of the chain guide 20 therefore takes place.

Figure 6:
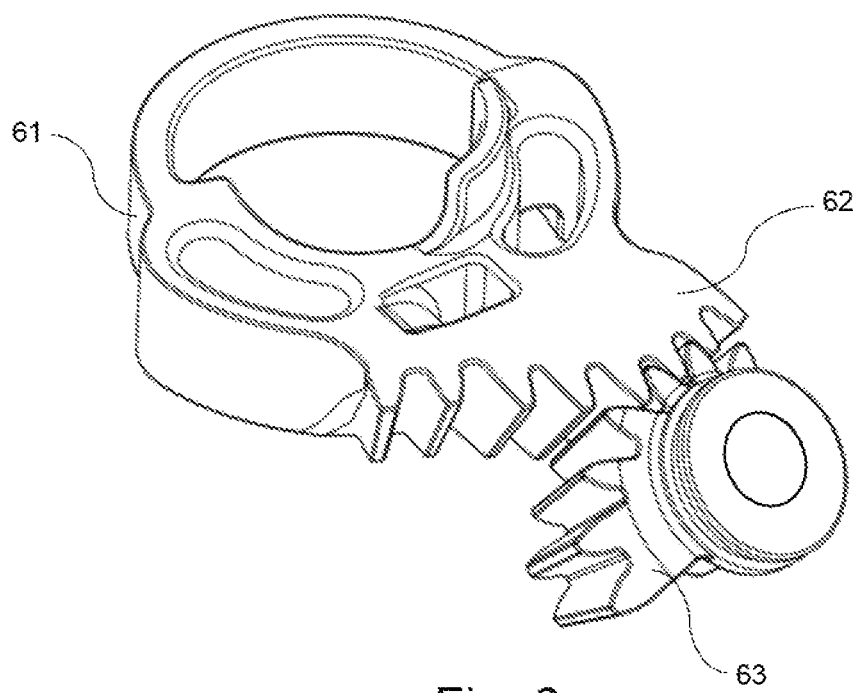
FIG. 6 is an enlarged view of the transmission with variable ratio of the gearshift of FIG. 3.

As can be clearly seen particularly in FIG. 6, the engagement formed by the toothed sector 62 and by the sprocket 63 is a non-circular gear, in which the teeth are arranged on a non-circular line; every tooth thus has its own radius with respect to its own rotation axis, different from the adjacent teeth. Therefore, the transmission has a variable gear ratio, between a minimum value and a maximum value.

Figure 7:
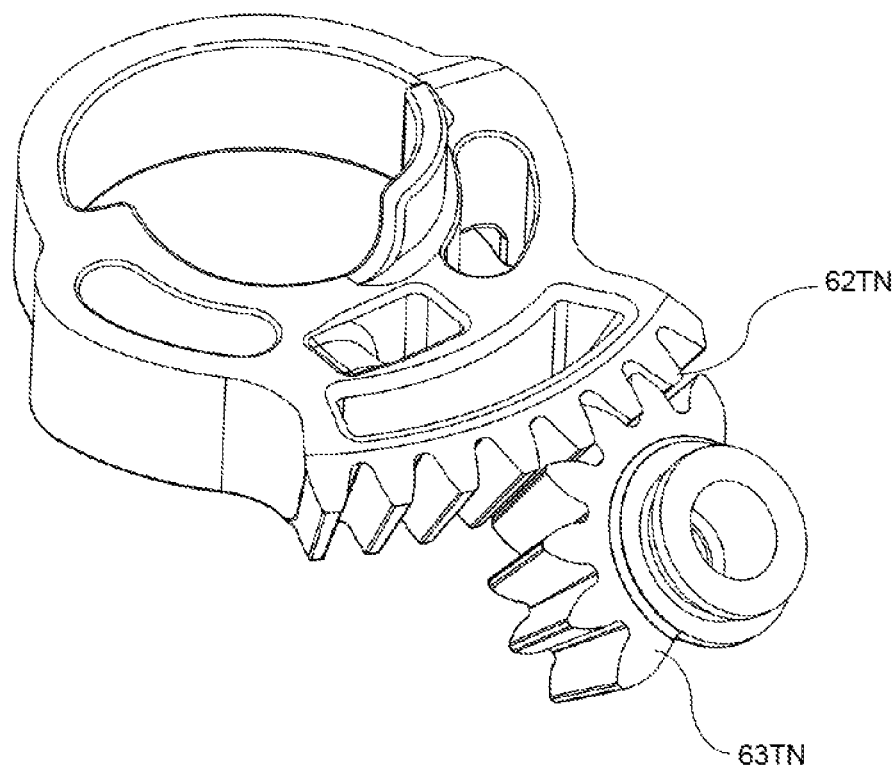
FIG. 7 shows (in an analogous manner to FIG. 6) the transmission with fixed ratio of the prior art.

For comparison, FIG. 7 on the other hand shows a gear 62TN, 63TN of an analogous gearshift according to the prior art (for example, corresponding to the quoted document EP 2769907 A1), in which the transmission has a fixed ratio, with a toothed sector 62TN and a sprocket 63TN that are circular.

Figure 8:
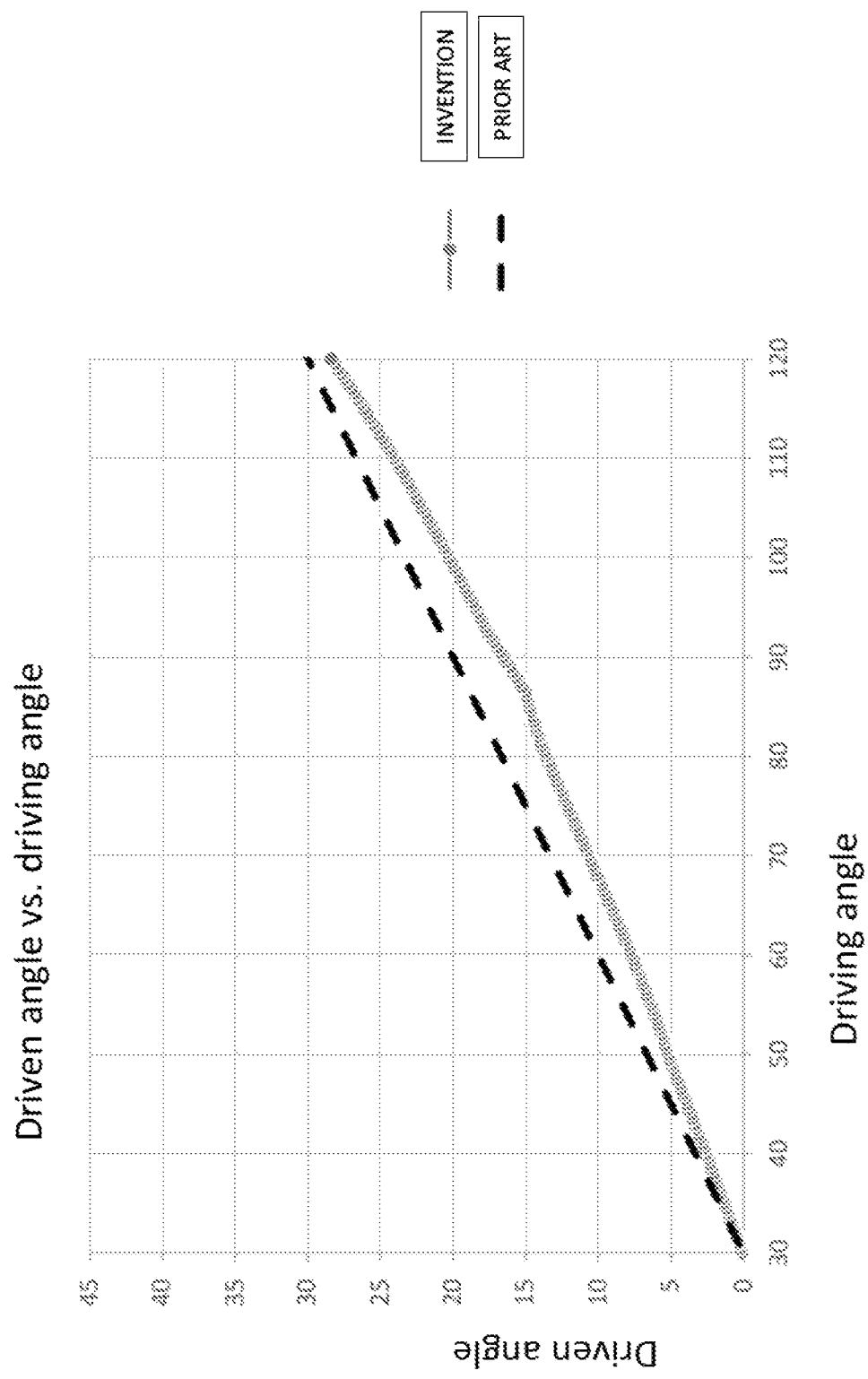
FIG. 8 is a diagram that compares the behavior of the transmission with variable ratio of FIG. 6 (gearshift of the invention) with the transmission of FIG. 7 (gearshift of the prior art), showing the progression of the displacement angle of the driven wheel (toothed sector) with respect to the rotation of the driving wheel (sprocket)

The diagram of FIG. 8 illustrates the kinematic behavior of the gear 62, 63 of the invention, compared with that of the gear 62TN, 63TN of the prior art. In particular, it can be seen that the relationship between the rotation angle of the driving wheel (sprocket) and that of the driven wheel (toothed sector) has linear progression in the prior art, whereas in the case of the invention the progression is not linear: as the rotation angle of the sprocket increases, the slope of the curve increases, i.e. the gear ratio increases.

In particular, the gear ratio can be about 1:4 in the initial part and reach 1:2 in the final part; to adapt to cogsets with a great excursion of diameters, like in the case of gearshifts for mountain bikes, it can even go from an initial value of 1:6 and reach 1:1.5.

Figure 9:
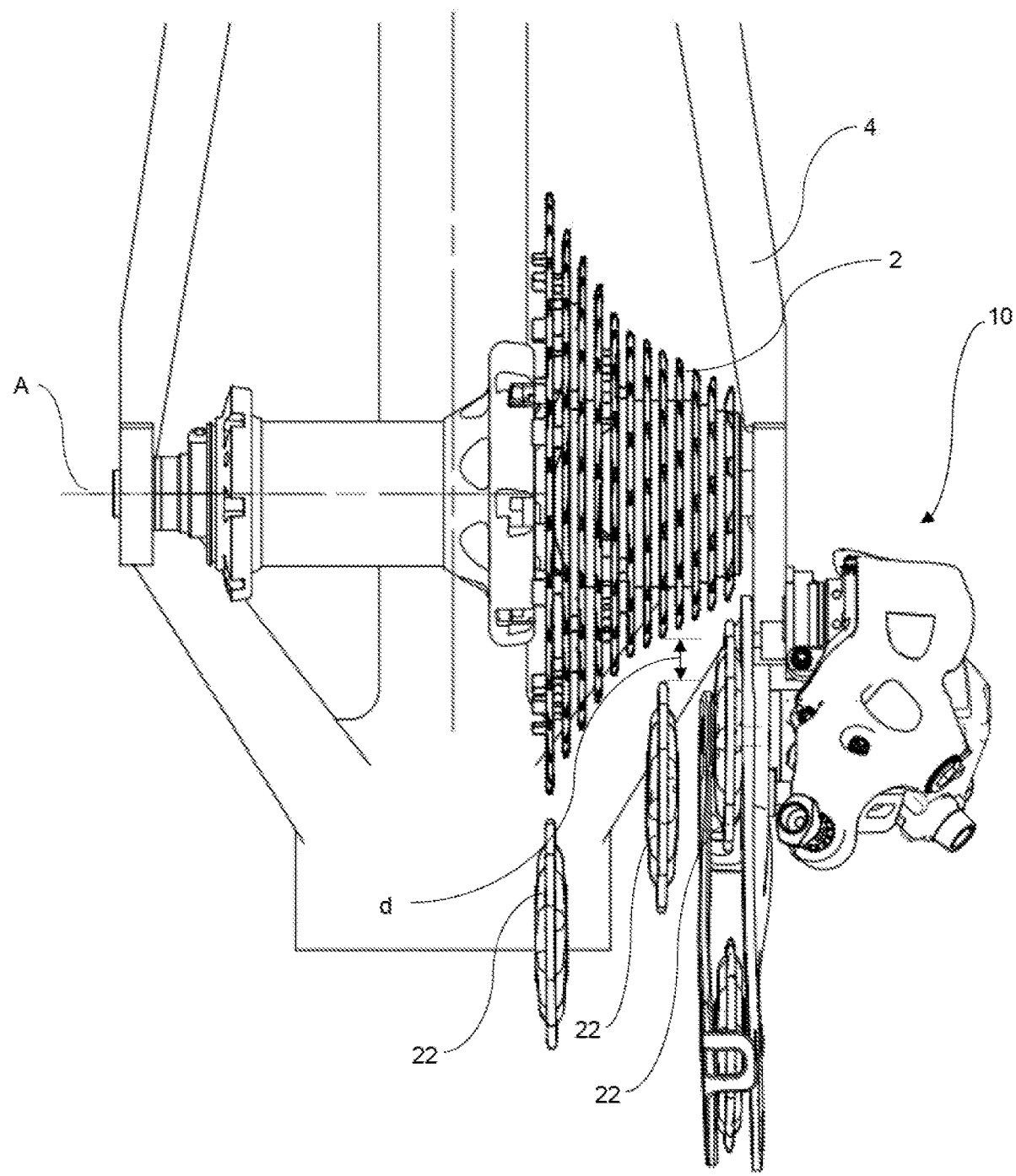
FIG. 9 is a top rear schematic view of the gearshift of FIG. 3, with the longest ratio inserted; the positions of the chain guide in the case of the insertion of the shortest ratio and of an intermediate ratio are also schematically represented.
Figure 10:
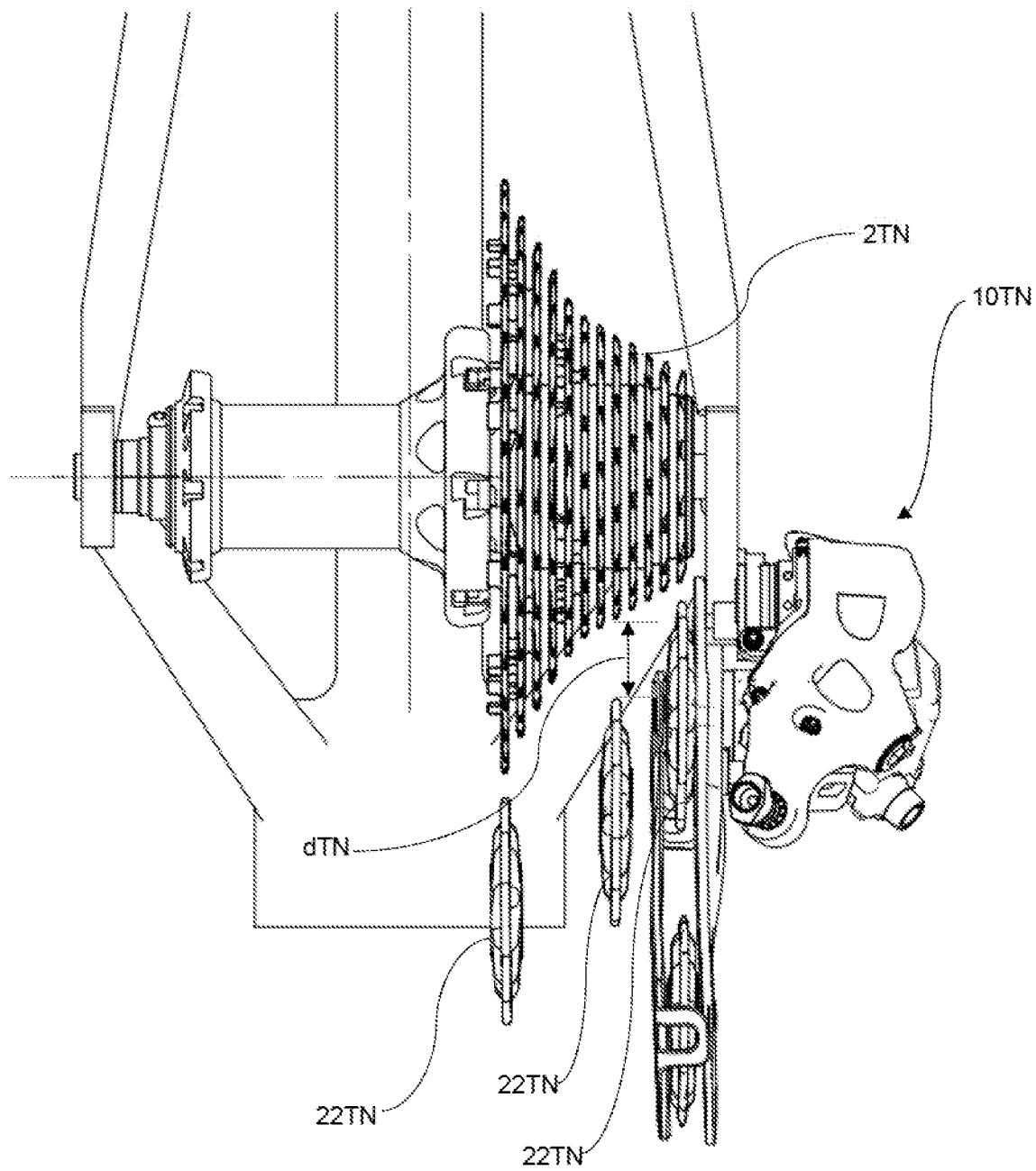
FIG. 10 shows (in an analogous way to FIG. 9) a gearshift of the prior art, for comparison.

FIGS. 9 and 10 illustrate the effect of the aforementioned different kinematic behavior on the positioning of the chain guide 20, in particular of its upper roller 22. FIG. 9 shows the gearshift 10 according to the invention, with the upper roller 22 in three positions, at the smallest sprocket (longer speed ratio), at the largest one (shorter speed ratio) and at an intermediate one. FIG. 10 shows a gearshift 10TN identical to the gearshift 10, except for the fact that it comprises a gear 62TN, 63TN according to the prior art, i.e. with constant gear ratio; in FIG. 10, for the single elements, reference numerals the same as those of the corresponding elements of the invention are used, with the addition of the suffix TN. It can thus be seen that—at the first and last sprocket of the cogset—the position of the upper roller 22 with respect to the cogset 2 is the same as that of the upper roller 22TN with respect to the cogset 2TN; differently, at the intermediate sprockets of the cogset 2, 2TN, the distance d between the upper roller 22 and the cogset 2 is substantially less than the distance dTN of the roller 22TN and the cogset 2TN.

The fact that the chain guide 20 is closer to the cogset 2, obtained thanks to the non-linearity (progressiveness) of the transmission 62, 63 with variable ratio, makes it possible to increase the precision, sensitivity and speed of gearshifting at the intermediate sprockets of the cogset 2, without for this reason causing risks of sliding or interference at the larger sprockets and the smaller sprockets.

FIGS. 11 to 19 show a gearshift 110 according to a second embodiment of the invention, which allows a further possibility of adjustment. The gearshift 110 according to this embodiment differs from, the gearshift 10 described earlier only as far as the sprocket and the pin are concerned, and only these elements will be described here; it should be understood that the remaining elements of the gearshift 110 are in accordance with what is described for the gearshift 10 and, hereinafter and in the drawings, they will be indicated simply with the same reference numerals.

Whereas in the gearshift 10 the sprocket 63 is fitted on the pin 16, in the gearshift 110 the sprocket 163 and the pin 116 can be coupled with one another through a coupling that makes it possible to mount them in at least two different mutual angular positions, so as to allow better initial adaptation to different cogsets.

In this way, the transmission formed by the sprocket 63 with the toothed sector 62 has a maximum angular excursion and a useful angular excursion; the useful excursion can be selected within the limitations of the maximum excursion according to the cogset 2 that it is wished to use.

For this purpose, the sprocket 163 comprises an axial hole 170, substantially cylindrical, provided with two pairs of opposite lateral seats 171, 172, extending in the hole 170 both in the radial direction and in the axial direction; the pair of opposite seats 171 is angularly offset from the pair of opposite seats 172 by an angle comprised between 10° and 30°, preferably about 20°. Correspondingly, the pin 116 comprises two opposite fins 173, extending axially on the pin 116 and radially from it. If it is wished to make the device adaptable to a greater number of cogsets, it is possible to provide three or more pairs of lateral seats.

The elements 170-173 thus form the coupling between the pin 116 and the sprocket 163, said coupling making it possible to couple the pin 116 and the sprocket 163 in two different angular positions, according to which of the pairs of seats 171, 172 is engaged by the fins 173. This feature is useful for a gearshift that provides for the coupling with different cogsets, for example selected according to the conditions that must be tackled by the cyclist. In this case, the coupling 170-173 makes it possible to give a different initial phasing to the gearshift 110, so as to best exploit the non-linearity of the transmission between toothed sector 62 and sprocket 163, in order to ensure the minimum distance between the roller 22 of the chain guide and the cogset 2 at all of the sprockets of the cogset.

Figure 20:
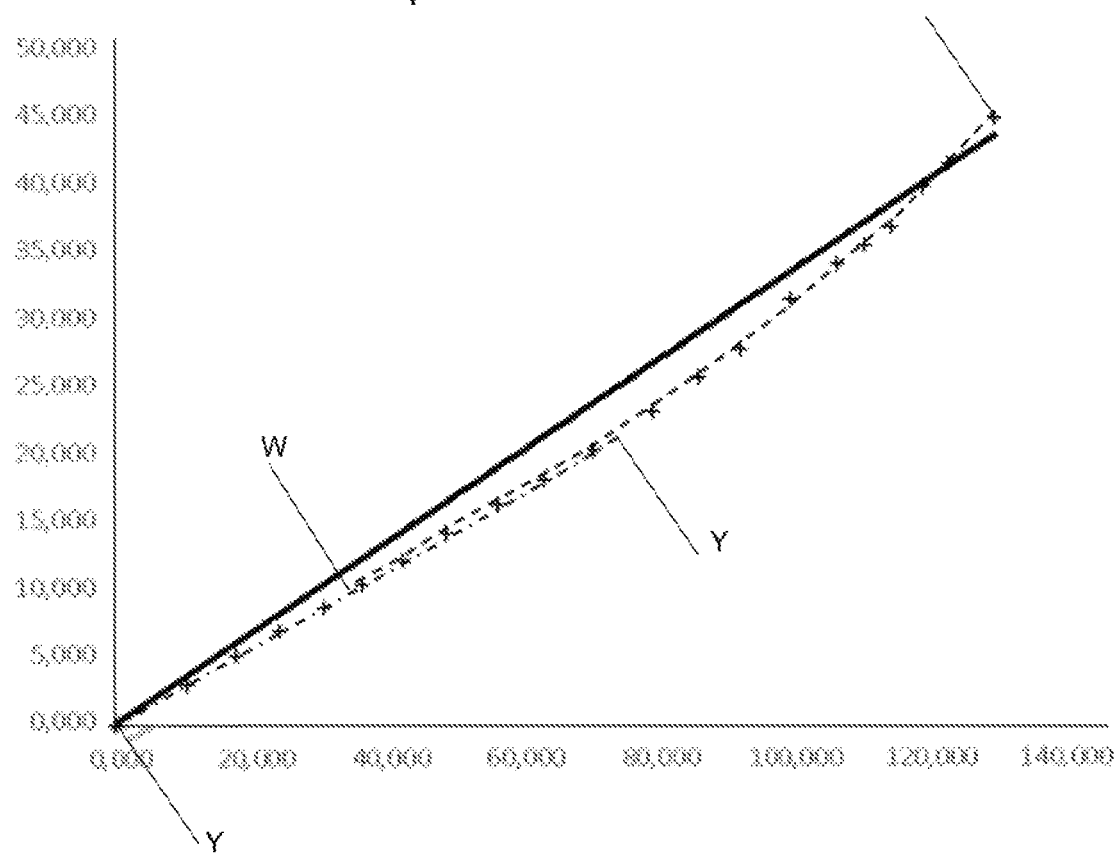
FIG. 20 is a diagram analogous to that of FIG. 8, which compares the behavior of the transmission with variable ratio of FIGS. 11-19 (gearshift of the invention) with the transmission of FIG. 7 (gearshift of the prior art), showing the progression of the displacement angle of the driven wheel (toothed sector) with respect to the rotation of the driving wheel (sprocket); since the transmission of FIGS. 11-19 allows two different setting positions, in the diagram of FIG. 20 the two curves corresponding to the two setting positions are shown.
Figure 21:
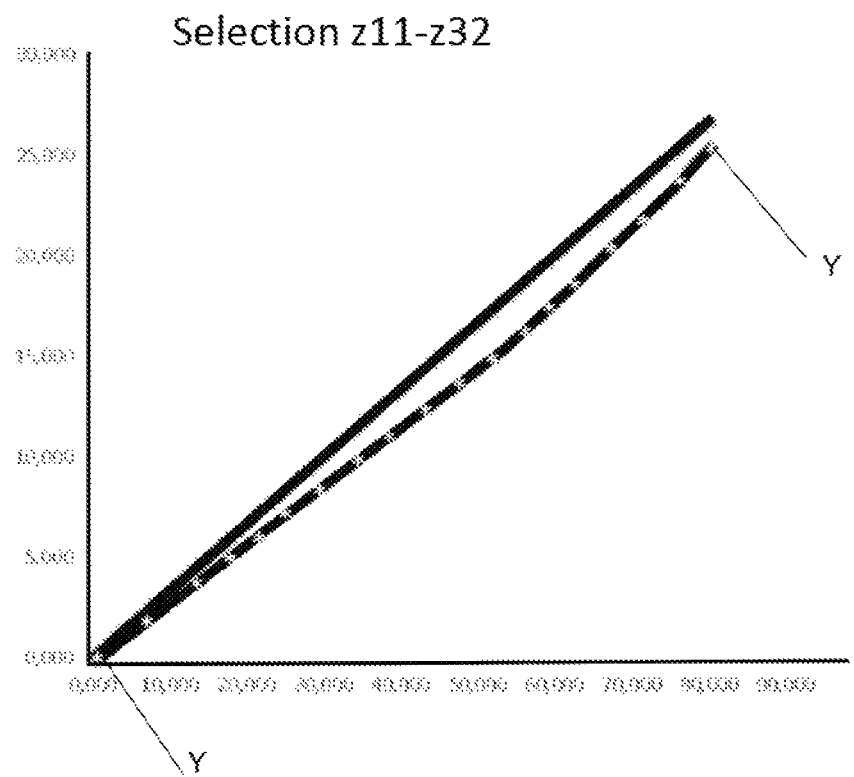
FIGS. 21 and 22 are diagrams derived from that of FIG. 20, in which only the curves referred to the two setting positions are shown isolated and amplified.
Figure 22:
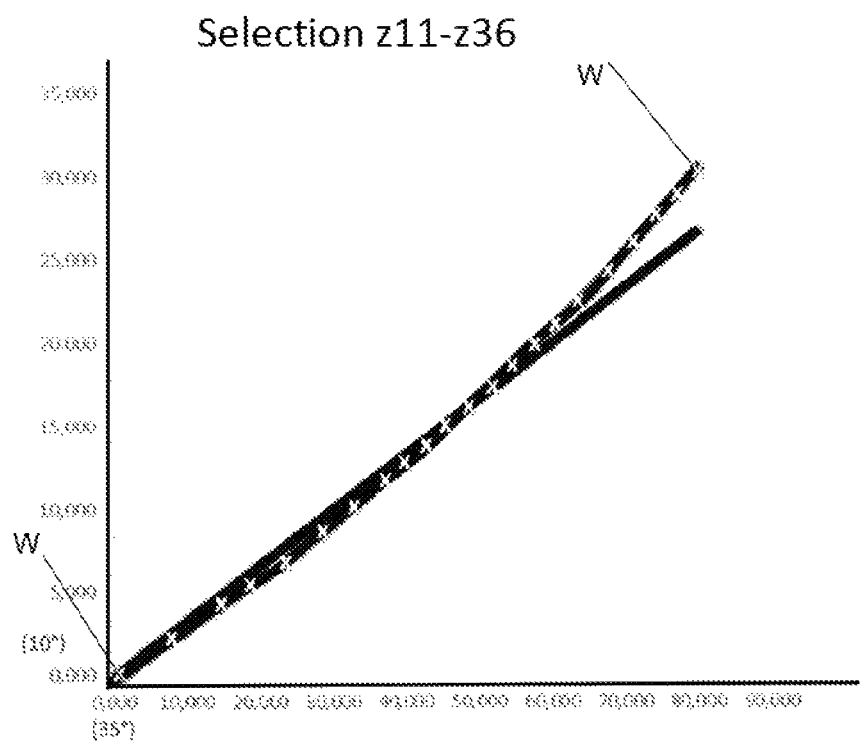
Figure 23:
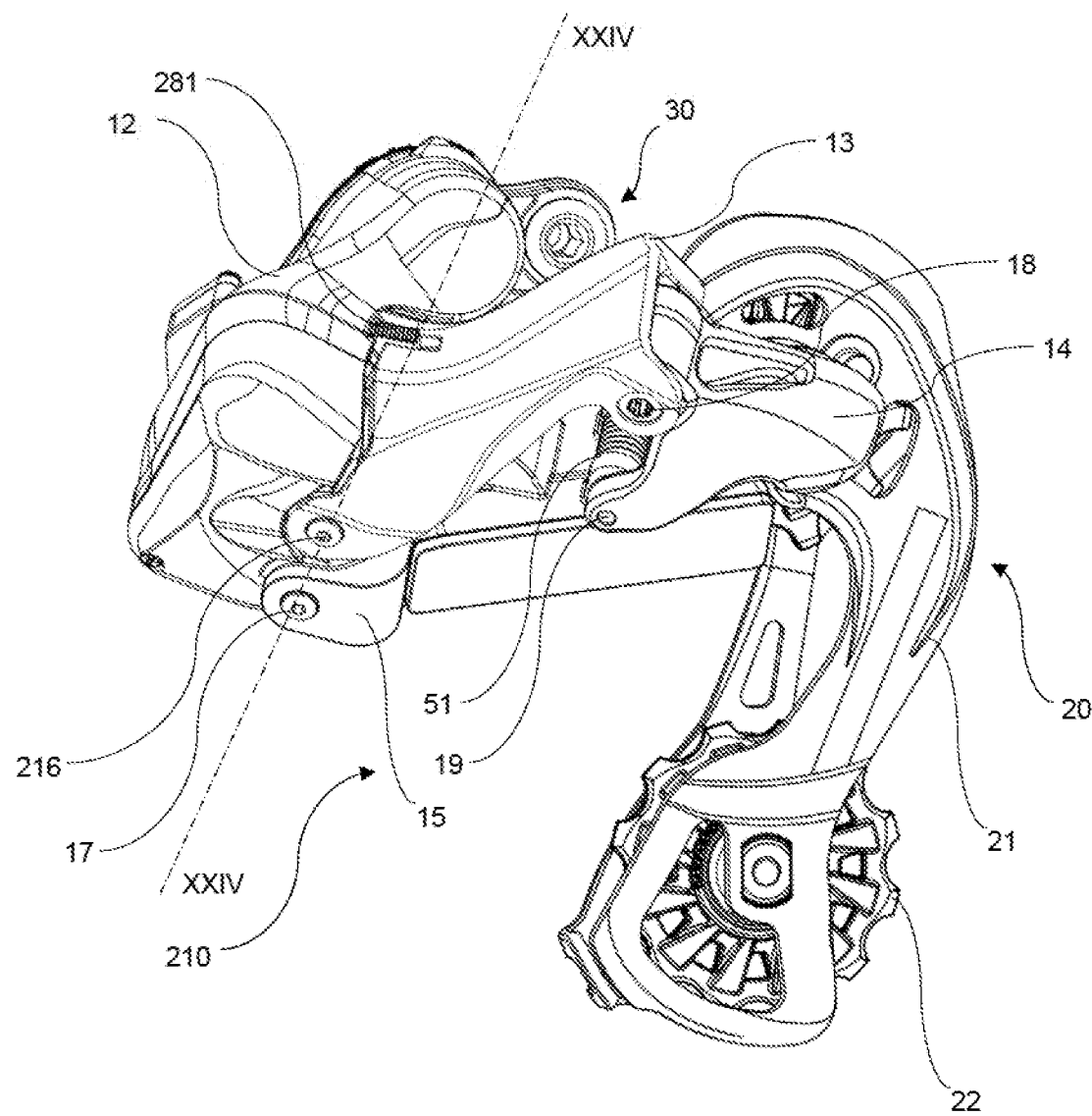
FIG. 23 is a view analogous to FIG. 3 of a third embodiment of the invention.
Figure 24:
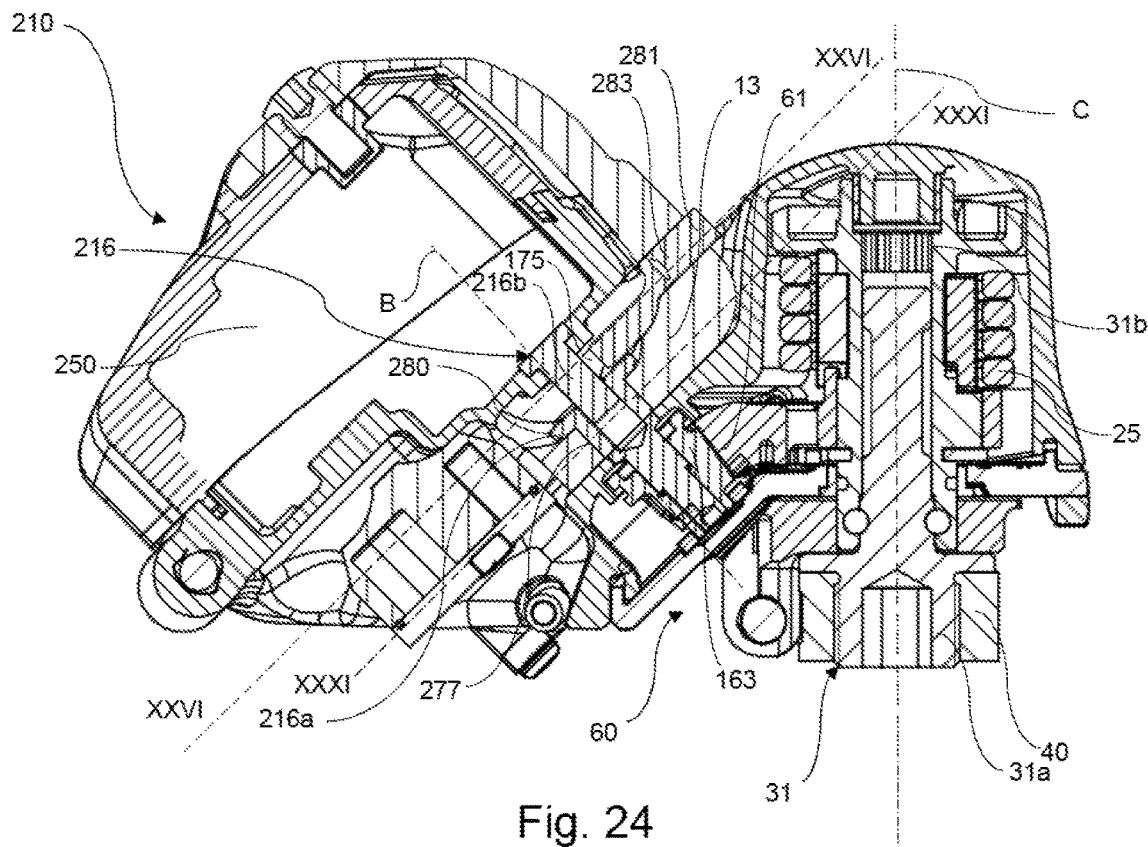
FIG. 24 is a section view of the gearshift of FIG. 23, according to the plane XXIV-XXIV indicated in FIG. 23.
Figure 25:
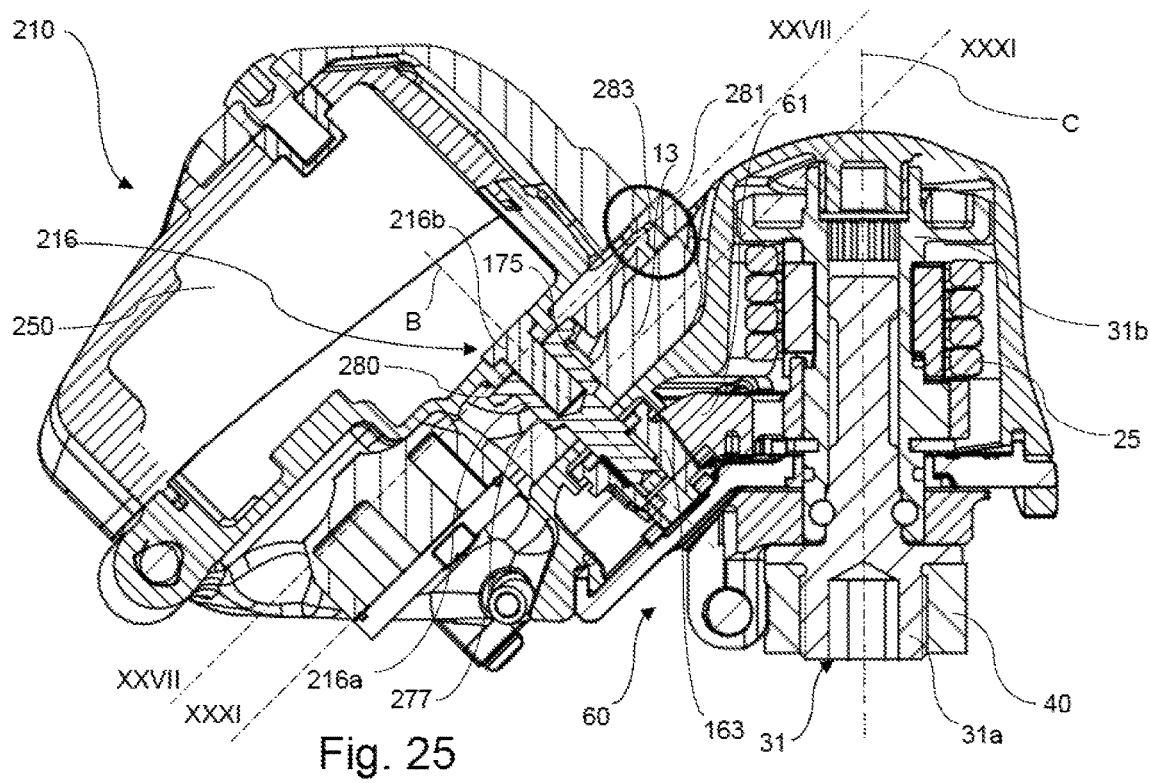
FIG. 25 is a view analogous to FIG. 24, during the setting operations of the gearshift.
Figure 26:
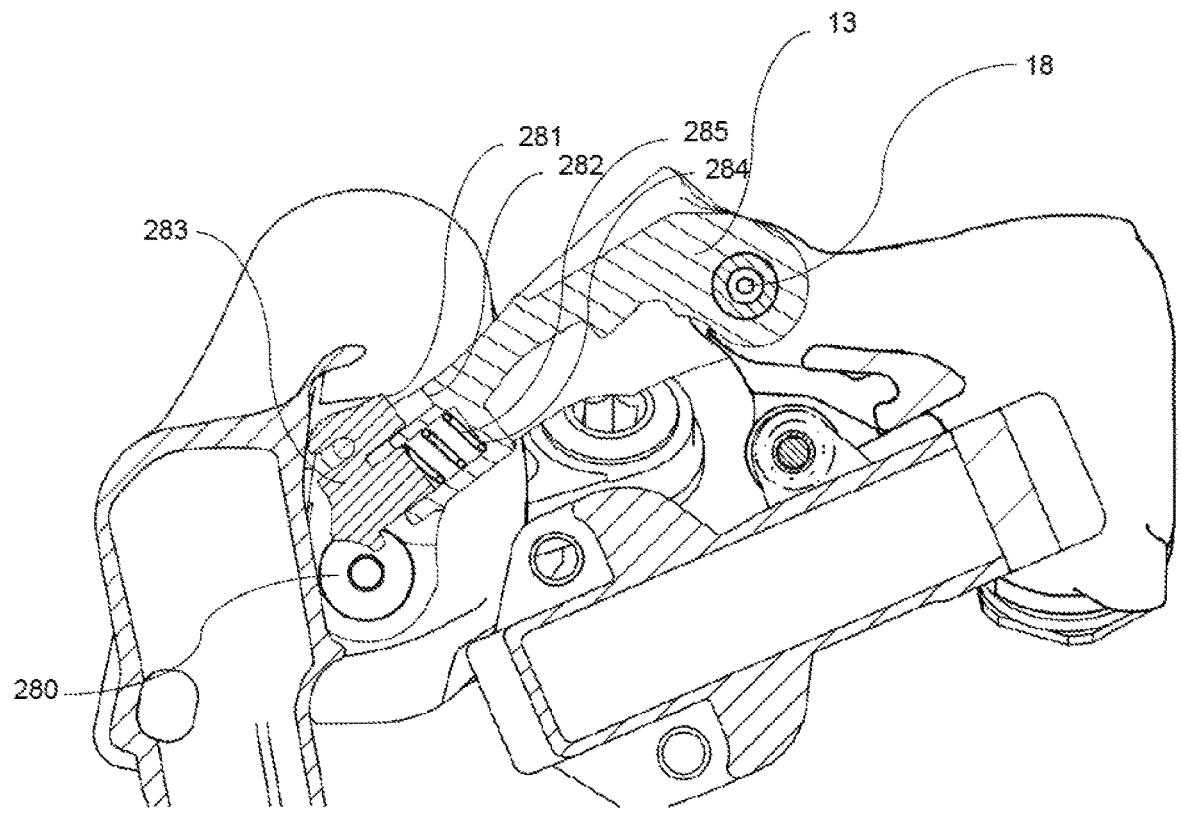
FIG. 26 is a partial section view along the plane XXVI-XXVI of the gearshift as shown in FIG. 24.
Figure 27:
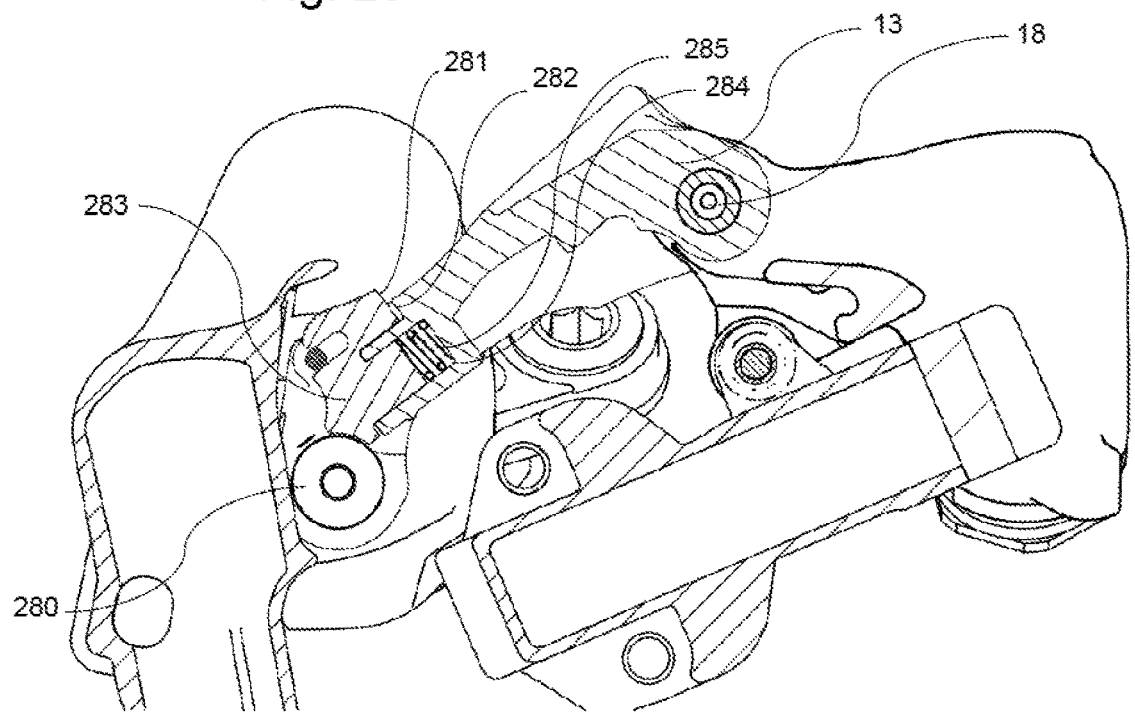
FIG. 27 is a partial section view along the plane XXVII-XXVII of the gearshift as shown in FIG. 25.

With reference to the diagrams of FIGS. 20-22, the useful angular excursion of the transmission, i.e. that actually used during operation, corresponds to a portion of the maximum excursion, and is adjustable through the positioning of the pin 116. In the example case, the maximum angular excursion of the sprocket 163 (driving angle) is 130°, that of the toothed sector 62 (driven angle) is about 45°, with a ratio of about 1:2.9. FIG. 20 shows, in an analogous way to FIG. 8, the kinematic behavior of the gear of the invention, compared with that of the prior art. When the pin 116 is coupled with the sprocket 163 in the seat 171, the initial and central portion thereof is exploited, according to the dashed and dotted line YY in FIG. 20, also shown—isolated and amplified—in FIG. 21; in this position, the excursion used by the driving wheel is 80°, that of the driven wheel is about 25°; the ratio is about 1:3.2, and is optimal for a cogset with smallest sprocket having 11 teeth and largest sprocket having 32 teeth (i.e. z11-z32). When the pin is coupled in the seat 172, the central and final portion thereof is exploited, according to the dashed line WW in FIG. 20, also shown— isolated and amplified—in FIG. 22 (where the zero angle corresponds, in FIG. 20, to an "absolute" angle of about 35° on the driving wheel and 10° on the driven wheel); in this position the excursion used by the driving wheel is 80°, that of the driven wheel is about 30°, the ratio is about 1:2.7, and is optimal for a cogset with the smallest sprocket having 11 teeth and the largest sprocket having 36 teeth (i.e. z11-z36). In this sense the gearshift of the invention can be defined "adaptive" since the coupling mechanism has variable phasing as a function of the cogset mounted, i.e. it makes it possible to select which part of the curve of FIG. 20 to go along, positioning the portion corresponding to the useful angular excursion of the transmission differently inside the maximum angular excursion (see FIGS. 20-22).

The pin 116 is mounted in the connecting rod 13 so as to be angularly mobile with it, but being able to be moved axially along the axis B. For this purpose, the pin 116 comprises a stem 174 having polygonal section whereas the connecting rod 13 comprises a polygonal seat 175 of shape matching the stem 174, extending along the axis B.

Figure 14:
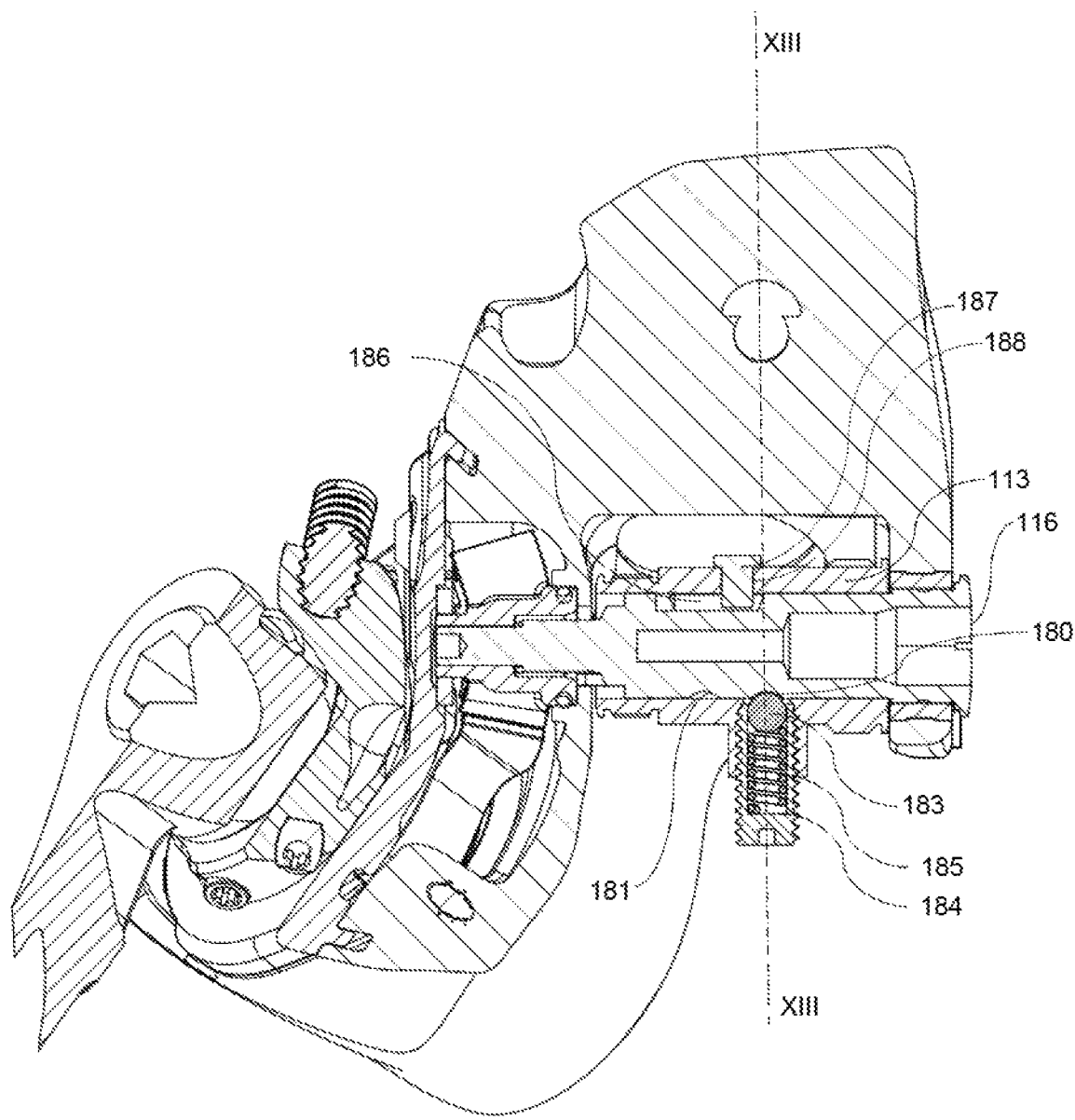
FIG. 14 is a partial section view along the plane XIV-XIV of the gearshift of FIG. 13.
Figure 15:
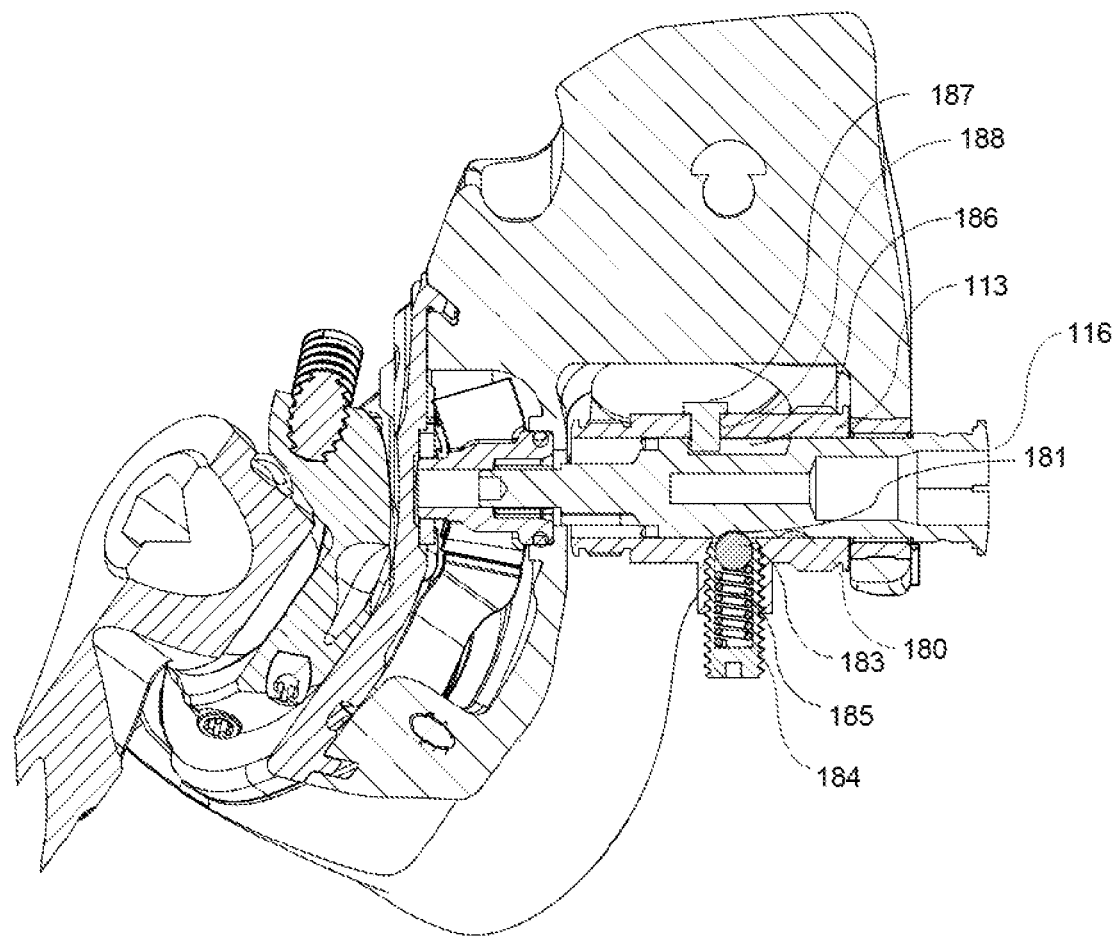
FIG. 15 is a view analogous to FIG. 14, during the setting operations of the gearshift.
Figure 16:
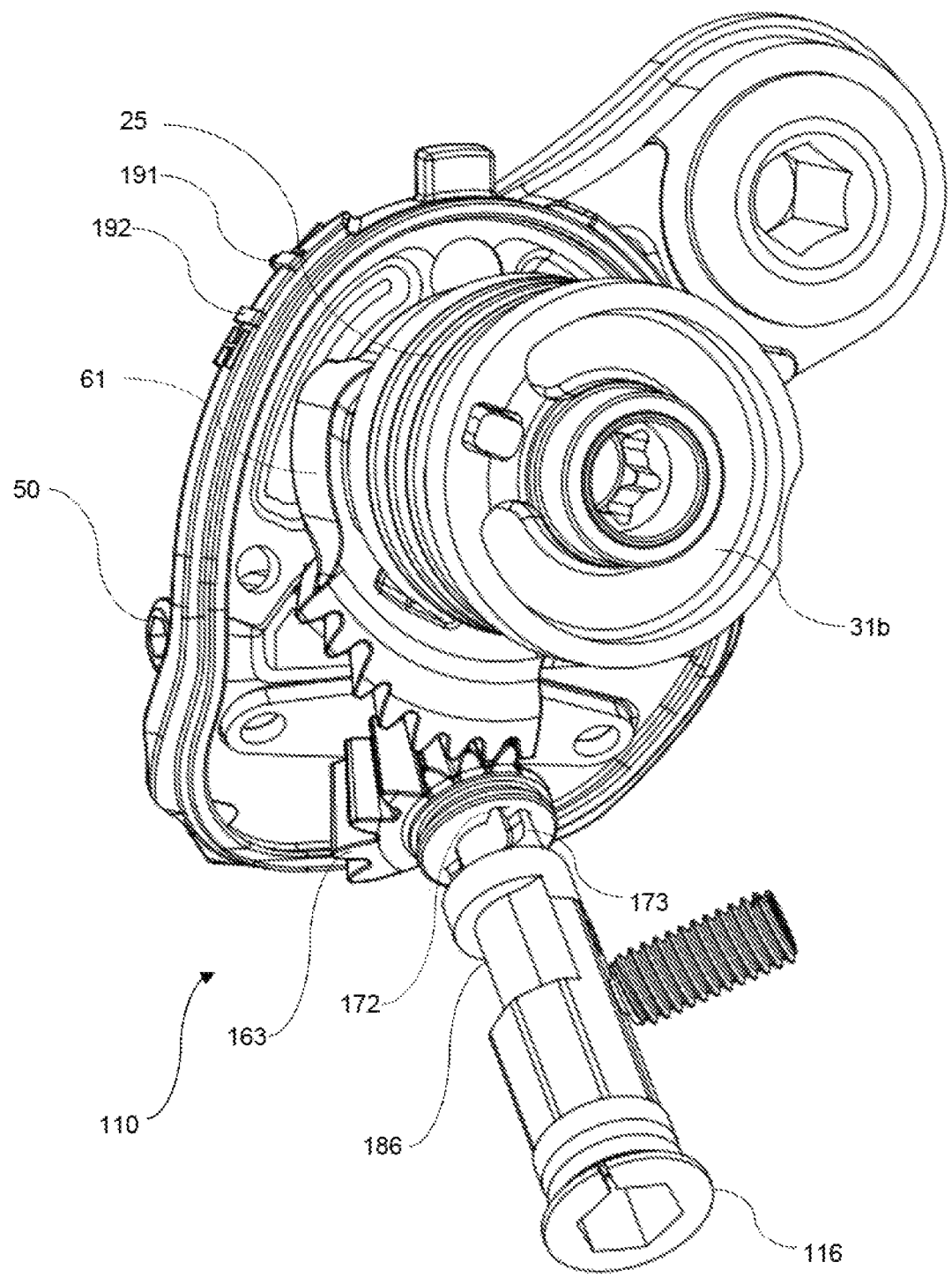
FIG. 16 is a front view of some parts of the gearshift of FIG. 13, isolated from the rest of the gearshift to better show the features of the invention, in a first setting position.
Figure 17:
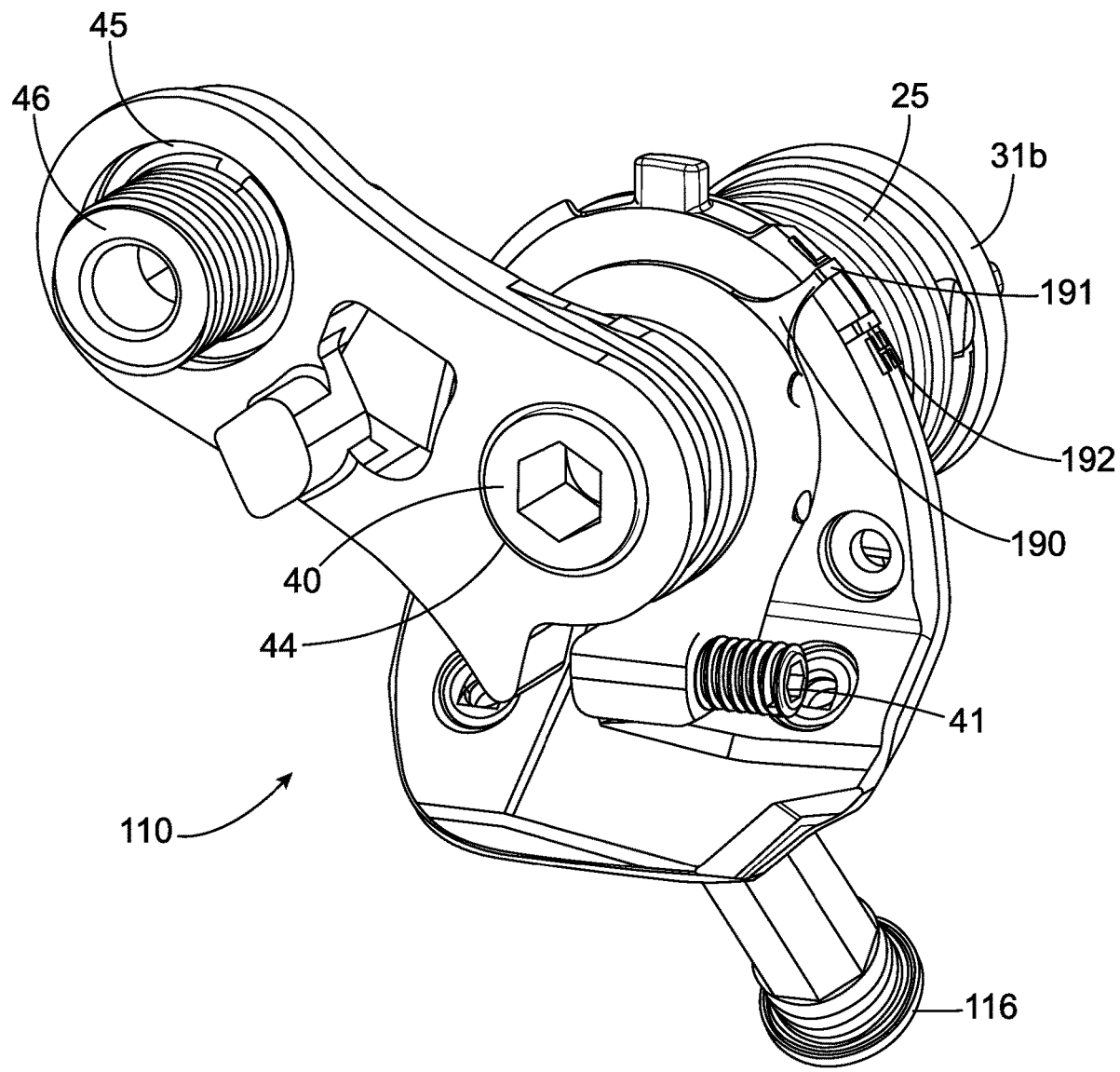
FIG. 17 is a rear view of the parts of the gearshift shown in FIG. 16.
Figure 18:
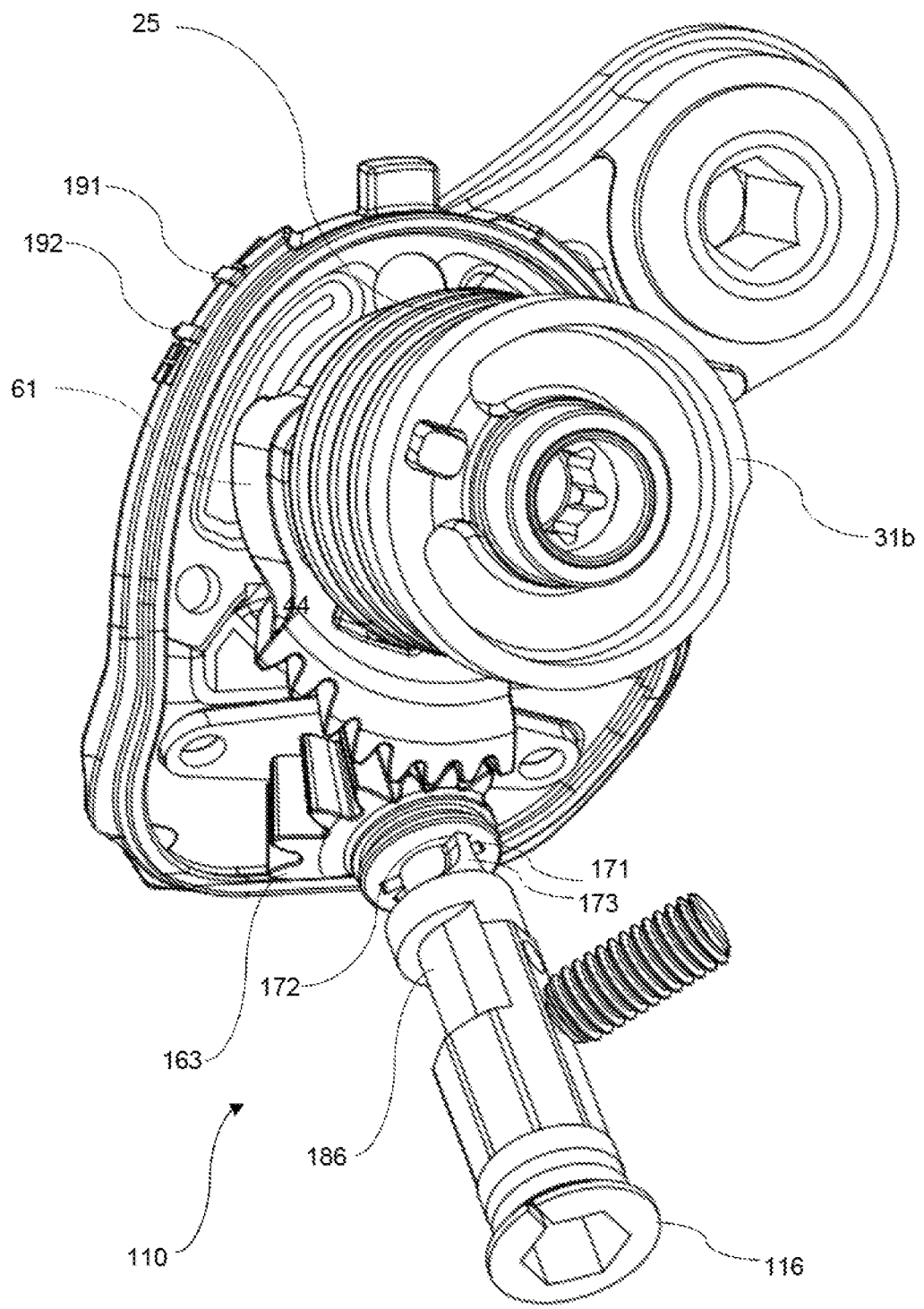
FIG. 18 is a front view of the same parts of the gearshift shown in FIG. 16, in a second setting position.
Figure 19:
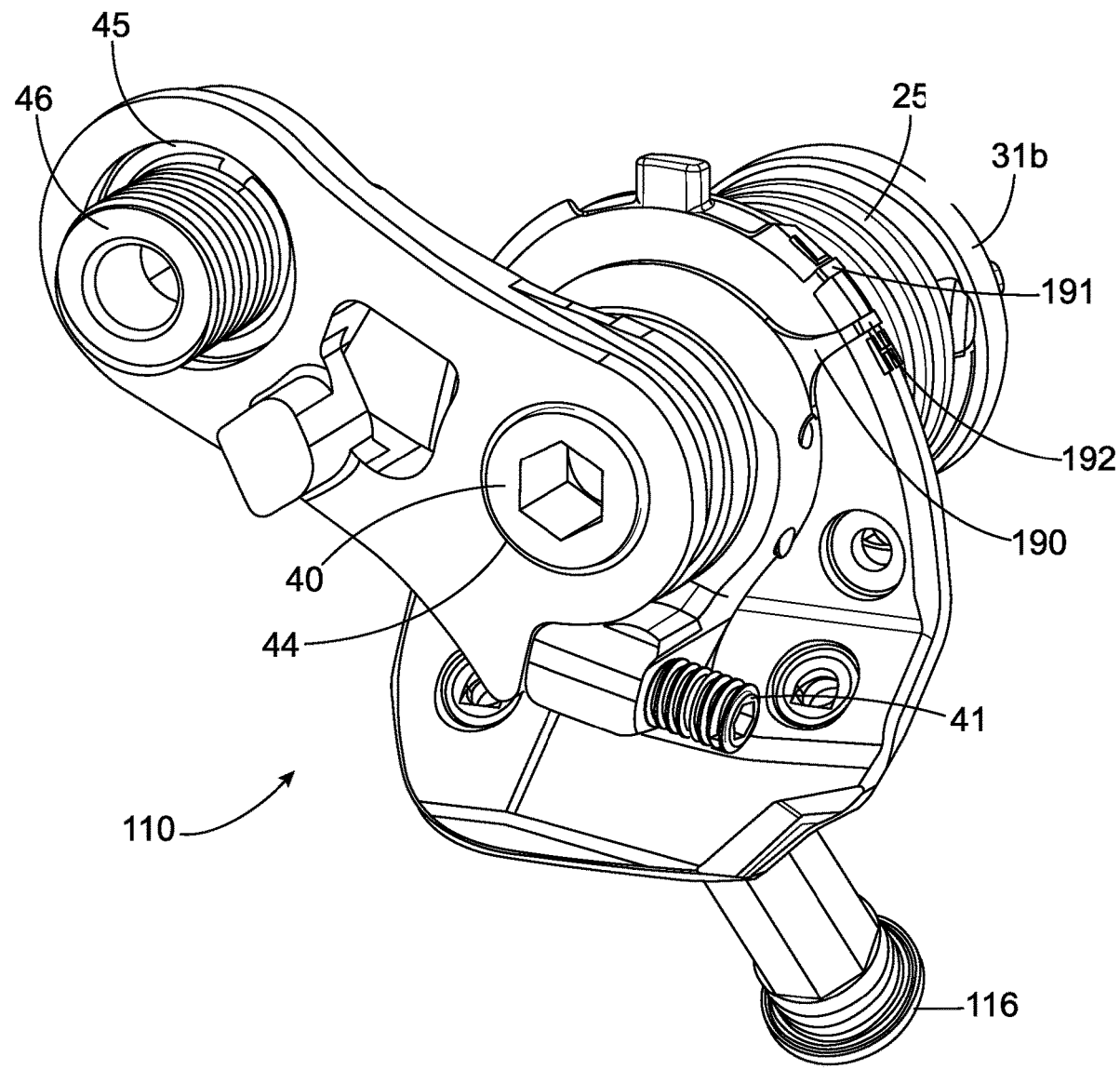
FIG. 19 is a rear view of the parts of the gearshift shown in FIG. 18.

The pin 116 can be moved along the axis B in the seat 175 between two positions: a coupling position (illustrated in FIG. 14) and a decoupling position (illustrated in FIG. 15). In the coupling position, the pin 116 is withdrawn, fully inserted with the fins 173 in one of the pairs of seats 171, 172 and therefore the sprocket 163 is constrained in the angular direction to the pin 116; this is therefore the position of normal operation of the gearshift 110. In the decoupling position, on the other hand, the pin 116 is extracted (partially) along the axis B, so that the fins 173 are free from the pairs of seats 171, 172; therefore, in this position, the sprocket 163 is angularly released from the pin 116. It is thus possible to angularly move the pin 116 with respect to the sprocket 163, to select in which of the pairs of seats 171 or 172 to engage the fins 173, according to the initial calibration that it is wished to give to the gearshift 110.

Removable locking means are also provided to hold the pin 116 in its coupling or decoupling position. These removable locking means comprise two recesses 180, 181, formed in the pin 116 on its side, aligned and spaced along the axis B, and a pointer 183 of rounded shape (in practice, a small ball) mounted in a lateral hole 184 formed in the seat 175; a spring 185 inserted in the lateral hole 184 elastically pushes the pointer 183 against the side of the pin 116, so that the pointer 183 is held engaged in one or other of the two recesses 180, 181. The rounded shape of the pointer 183 ensures that a pressure in the direction of the axis B can determine the disengagement of the pointer 183 from the recesses 180, 181.

An end stop mechanism is also provided for the pin 16, to avoid it completely slipping out from its seat 175 during the initial calibration operations. This end stop mechanism comprises a recess 186 on the side of the pin 116, in which a dowel 187 engages, inserted in a lateral hole 188 of the seat 175.

The gearshift 110 also comprises an outer indicator of the mutual angular position that has been set between the pin 116 and the sprocket 163. The outer indicator comprises an indicator 190, rotatably mounted on the base body 12 and rotating as a unit with the sprocket 163, and two verification notches 191, 192 formed on the base body 12; depending on which of the seats 171 or 172 is engaged by the fins 173, the indicator 190 points towards one or other of the verification notches 191, 192. In this way, it can immediately be seen on the outside which setting has been set and therefore with which cogset 2 the gearshift 110 can be advantageously used.

Figure 11:
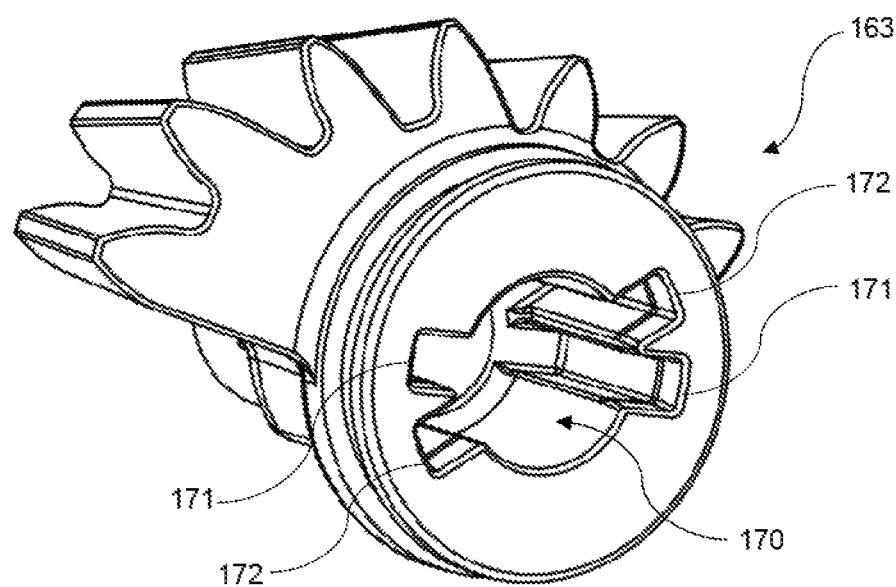
FIG. 11 is an enlarged view of a component of the transmission with variable ratio, according to a second embodiment of the invention.
Figure 12:
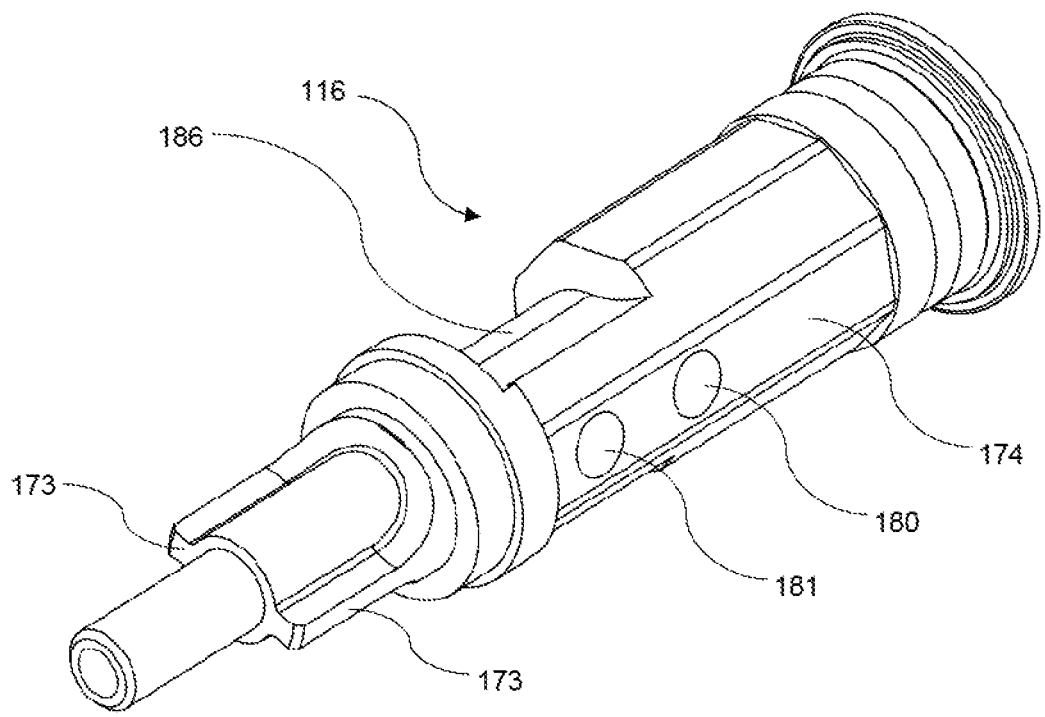
FIG. 12 is an enlarged view of another component of the transmission with variable ratio, according to the embodiment of the invention of FIG. 11.
Figure 13:
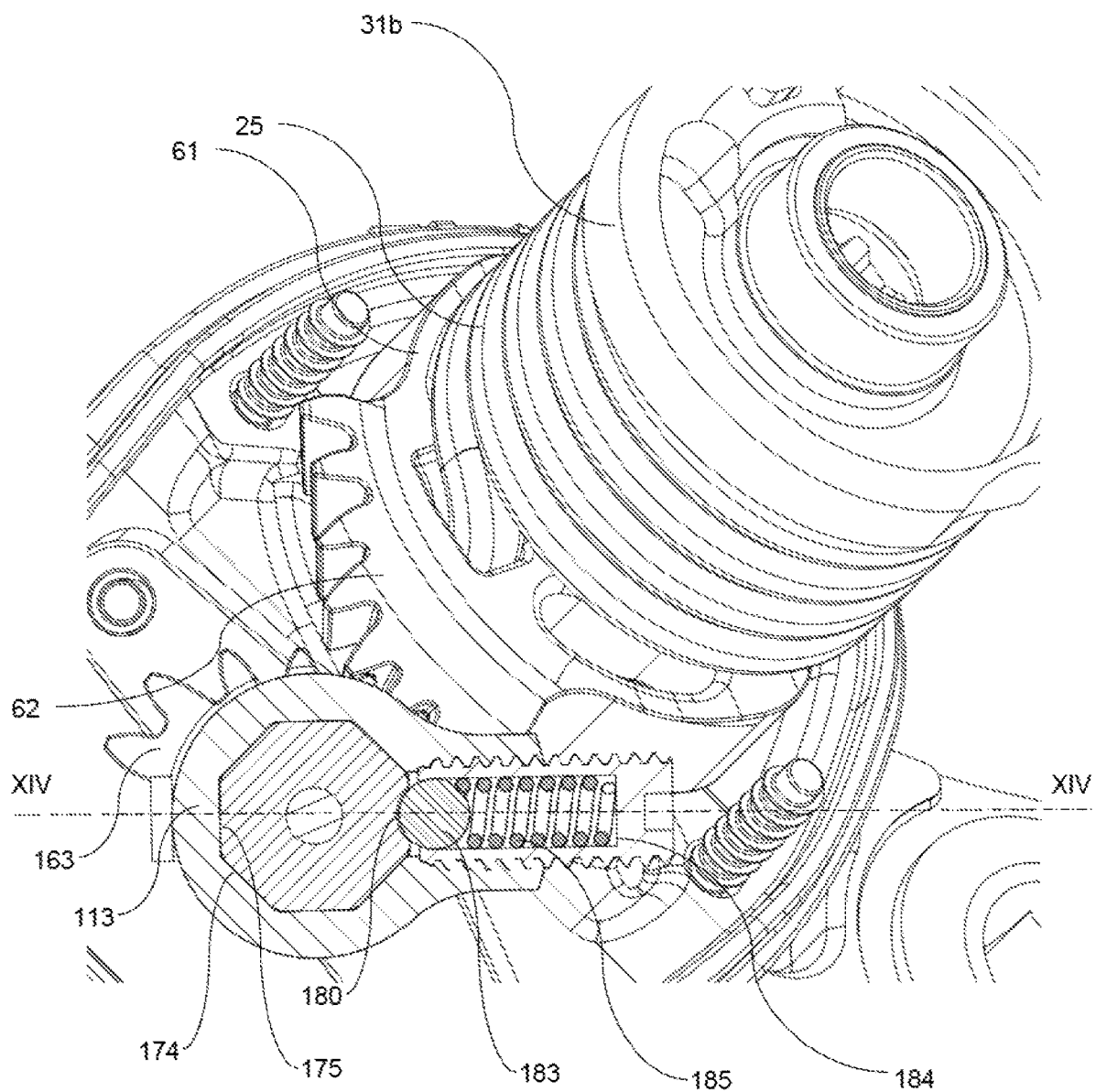
FIG. 13 is a partial section view along the plane XIII-XIII of the gearshift according to the embodiment of FIGS. 11 and 12.

Whereas FIGS. 11 and 12 show the sprocket 163 and the pin 116 in isolation, the sections of FIGS. 13-15 clearly show the locking means 180-185 and the end stop mechanism 186-188. In particular, the section of FIG. 14 shows the coupling position of the pin 116, whereas the section of FIG. 15 shows the decoupling position thereof.

FIGS. 16-19 clearly show the two possible initial calibration or setting conditions. In particular, in FIGS. 16 and 17 the fins 173 are engaged in the seats 171 and consequently the indicator 190 points onto the verification notch 191, whereas in FIGS. 18 and 19 the fins 173 are engaged in the seats 172 and consequently the indicator 190 points onto the verification notch 192.

FIGS. 23 to 31 show a gearshift 210 according to a third embodiment of the invention, which allows the same possibility of adjustment as the second embodiment. The gearshift 210 according to this embodiment differs from the gearshift 110 described earlier only as far as the removable locking means for holding the pin are concerned, and only these will be described here; it should be understood that the remaining elements of the gearshift 210 are in accordance with what was described for the gearshift 110 and for the gearshift 10 and, hereinafter and in the drawings, they will be indicated simply with the same reference numerals; the kinematic behavior of the gearshift 210 is thus illustrated in the same FIGS. 20-22 that illustrate that of the gearshift 110.

It should be noted that the gearshift 210 is of the type with motorized actuation means, generically indicated with 250, not illustrated in detail since they are per se not relevant for the purposes of the present invention.

The pin 216 (as can be seen particularly in FIGS. 24, 25, 29 and 30) is formed from two coaxial parts 216a and 216b, coupled together so as to be able to slide axially with respect to one another, while still rotating as a unit; this feature is obtained thanks to a prismatic coupling (not visible in the figures). The part 216a comprises the fins 173 and with them engages in the seats 171, 172, exactly like in the gearshift 110; the part 216a is also provided with a shaped stem 274, for key-type coupling in a corresponding shaped portion 277 of the seat 175 in the connecting rod 13. The shaped portion 277 is made in the connecting rod 13 with the help of a detachable portion 278 of the connecting rod 13 (visible in FIG. 31), connected to the rest of the connecting rod 13 by means of two screws 279.

The removable locking means for holding the part 216a of the pin 216 in its coupling position comprise a flange 280 on the part 216a and a bolt 283 slidably mounted in a slit 284 open transversally in the seat 175 of the connecting rod 13. The bolt 283 is mobile between a retaining position (FIGS. 24 and 26) and a release position (FIGS. 25 and 27); in the retaining position, the bolt 283 projects inside the seat 175 and holds the flange 280 of the part 216a of the pin 216, so that the part 216a cannot disengage from the sprocket 163; in the release position, the bolt 283 is recessed in the slit 284 and does not interfere with the flange 280, thus allowing the part 216a to slide axially with respect to the part 216b, thus disengaging from the sprocket 163. In the slit 284, there is a spring 285 that pushes the bolt 283 towards the retaining position. The slit 284 is provided with a lateral window 282 extending longitudinally with respect to the slit 284 and open towards the outside of the connecting rod 13; through the window 282 it is possible to manually maneuver a maneuvering portion 281 of the bolt 283, to push the bolt 283 into its release position in contrast to the spring 285.

Differently from the gearshift 110, the gearshift 210 does not need an end stop mechanism, since it is intrinsically useless. Indeed, only the part 216a of the pin 216 slides axially, which is in any case locked axially inside the seat 175 in the connecting rod 13 by the part 216b, which is not axially mobile.

Figure 28:
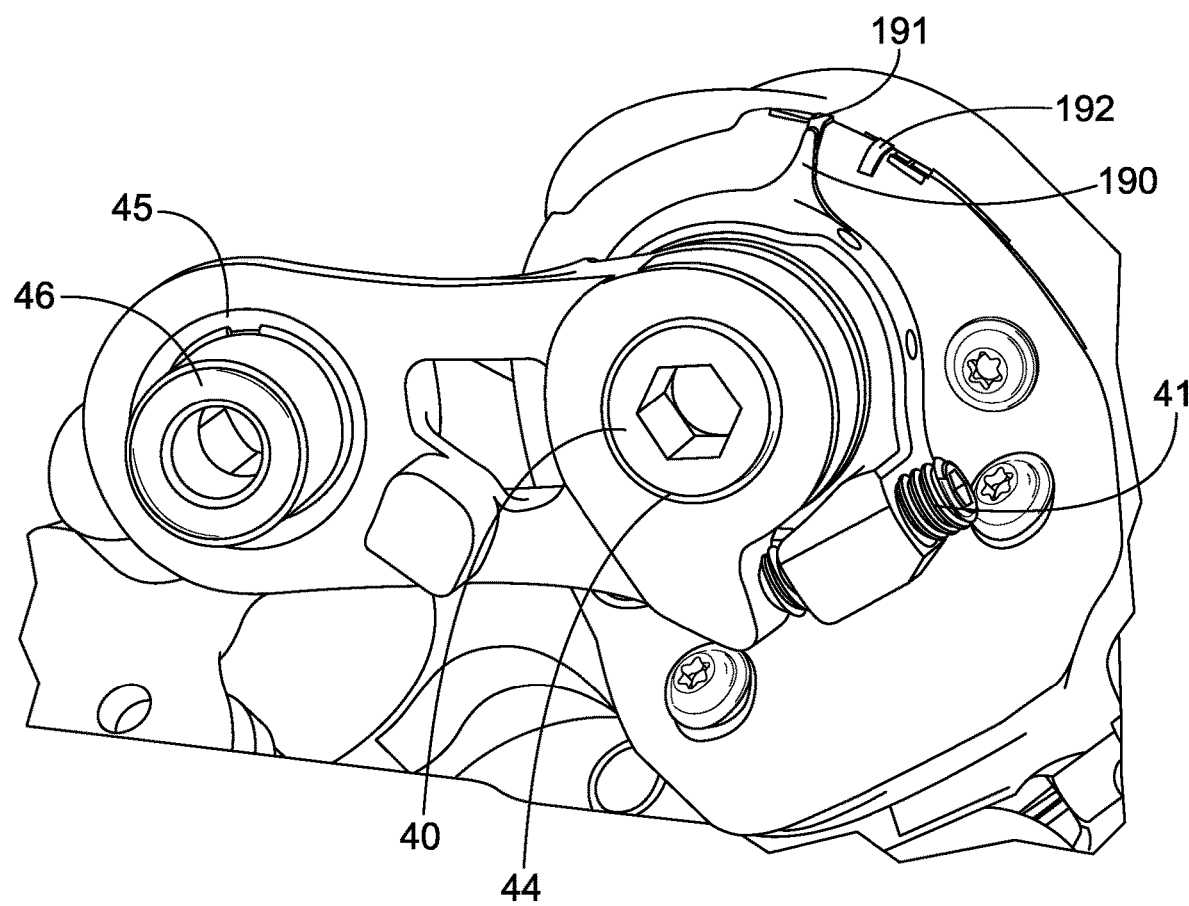
FIG. 28 is a rear view of the parts of the gearshift shown in FIG. 26.
Figure 29:
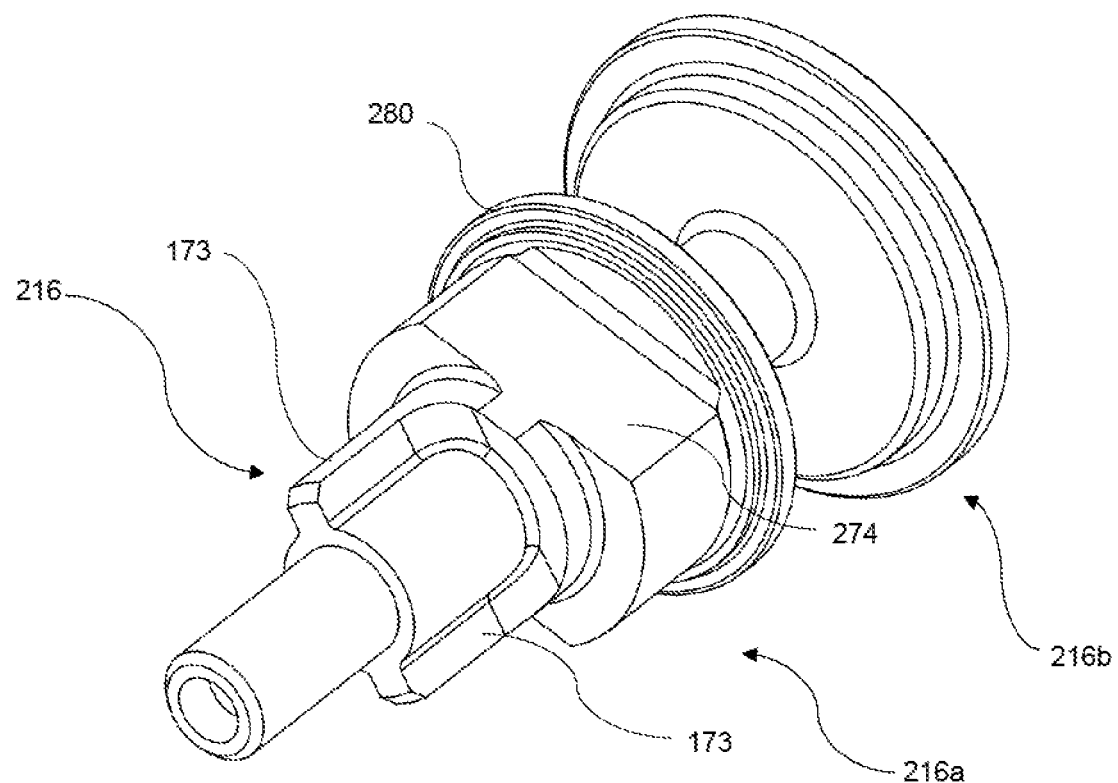
FIGS. 29 and 30 are enlarged views of a component of the transmission with variable ratio, according to the embodiment of the invention of FIGS. 23-28.
Figure 30:
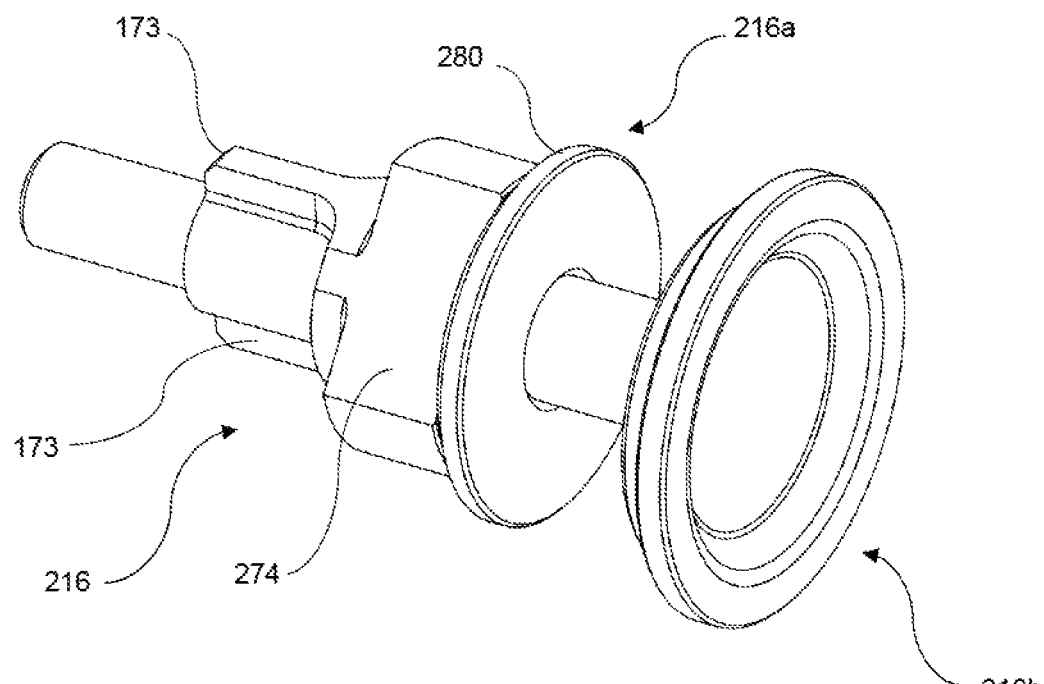
Figure 31:
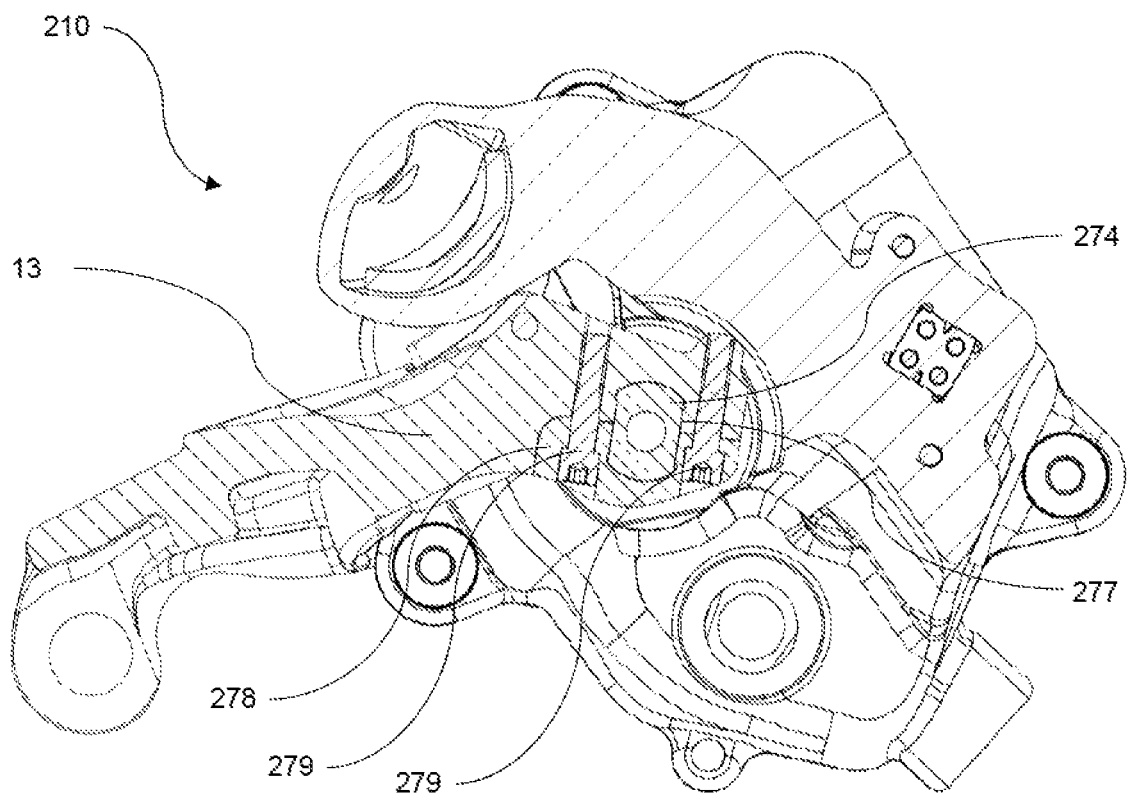
FIG. 31 is a section view along the plane XXXI-XXXI of the gearshift of FIGS. 26 and 27.

On the other hand, in a totally similar way to the gearshift 110, the gearshift 210 is also provided with an outer indicator 190-192, as can be seen in FIG. 28.

From the above description and from the drawings the features and the operation of the bicycle gearshift object of the present invention can clearly be seen, just as the relative advantages are also clear.

Thanks to the change of the initial relative position between the base body of the articulated quadrilateral linkage and the pin body of the first fixing group it is possible to reach relative positions between the chain guide and the sprockets that make it possible to obtain, on the one hand, greater sensitivity of control with respect to gearshifts of the state of the art, and on the other hand to reduce the drawbacks correlated to the chain guide being too close to the sprocket with the largest diameter.

Thanks to the non-linearity of the transmission with variable ratio, in particular, it is possible to ensure that the chain guide is always as close as possible to the sprocket on which the chain is engaged, whatever the axial position of this sprocket inside the cogset.

Further variants of the embodiments described above are possible, not explicitly described but encompassed by the scope of protection defined by the claims.

It is for example possible to provide for the means for actuating the gearshift to be of a different type (for example, electrically actuated) or arranged so as to act on the articulated quadrilateral linkage in a different manner with respect to what is illustrated.

What is claimed is:

1. A bicycle gearshift comprising:
   an articulated quadrilateral linkage with a base body and a mobile body connected together through a pair of connecting rods articulated to the base body and to the mobile body,
   a fixing group that connects the base body to a bicycle frame,
   a chain guide mounted on the mobile body, the articulated quadrilateral linkage being associated with a gearshift actuator that deforms the articulated quadrilateral linkage so as to determine a displacement of the mobile body with respect to the base body and consequently a primary displacement of the chain guide in an axial direction with respect to an axis (A) of a cogset;
   wherein the fixing group comprises:
   a pin body, that has an axis (C) and fixes the base body to the bicycle frame,
   a mechanism for changing a relative angular position between the base body of the articulated quadrilateral linkage and the bicycle frame as a function of the primary displacement of the chain guide, wherein the mechanism comprises:
   a rotary body connected to the pin body such that a rotation of the rotary body determines a relative rotation about the axis (C) between the pin body and the base body;
   a pin set in rotation by the gearshift actuator,
   a transmission between the pin and the rotary body that has a variable gear ratio.

2. The bicycle gearshift according to claim 1, wherein the transmission between the pin and the rotary body comprises a non-circular gear, with a toothed sector rotating as a unit with the rotary body and a sprocket rotating as a unit with the pin, wherein the toothed sector and the sprocket are mutually engaged and have toothings with variable diameters.

3. The bicycle gearshift according to claim 2, wherein the pin and the sprocket are selectively coupled in at least two mutual angular positions.

4. The bicycle gearshift according to claim 3, wherein the coupling between the pin and the sprocket is a front coupling and comprises:
   an axial hole formed in the sprocket and provided with at least two pairs of opposite seats extending radially from the hole, and
   two opposite fins formed extending radially on the pin, in removable engagement in one of the pairs of seats in the hole of the sprocket.

5. The bicycle gearshift according to claim 3, comprising an outer indicator of the at least two mutual angular position between the pin and the sprocket.

6. The bicycle gearshift according to claim 1, wherein the pin is mounted between the base body and a first of the pair of connecting rods, the pin is housed in a seat formed in the first connecting rod, and the pin is locked in the seat with respect to the rotation and rotatable with respect to the base body.

7. The bicycle gearshift according to claim 6, wherein the pin comprises a stem having polygonal section and wherein the seat has a corresponding polygonal section.

8. The bicycle gearshift according to claim 6, wherein the seat in the connecting rod comprises a shaped portion, formed with the help of a detachable portion of the first connecting rod, and a stem has a corresponding shaped section.

9. The bicycle gearshift according to claim 6, wherein the pin moves axially in the seat between a withdrawn coupling position in which the pin is coupled with the sprocket and an extracted decoupling position in which the pin is decoupled from the sprocket, and wherein a removable lock keeps the pin in a selected one of the withdrawn coupling and extracted decoupling positions.

10. The bicycle gearshift according to claim 9, wherein the removable lock comprises:
   two recesses formed in the pin, aligned and spaced in the direction of the axis (B) of the pin,
   a pointer mounted in a lateral hole formed in the seat, and
   an elastic element in the lateral hole, said elastic element elastically pressing the pointer in the radial direction so as to keep the pointer engaged with one or other of the two recesses.

11. The bicycle gearshift according to claim 9, wherein the removable lock comprises:
   a slit open transversally on the seat,
   a lateral window of the slit, longitudinal with respect to the slit and facing the outside of the first connecting rod,
   a bolt, mounted mobile in the slit between a retaining position in which it projects inside the seat and holds the pin in its withdrawn coupling position with the sprocket and a release position in which it does not project in the seat and allows the pin to be taken into its extracted decoupling position from the sprocket,
   an elastic element that pushes the bolt into its retaining position,
   a maneuvering portion of the bolt, projecting from the window so as to be able to be actuated to move the bolt in contrast to the elastic element.

12. The bicycle gearshift according to claim 9, comprising an end stop mechanism that prevents the withdrawal of the pin from the seat beyond the extracted decoupling position.

* * * * *